US011178124B2

(12) United States Patent
Khan et al.

(10) Patent No.: US 11,178,124 B2
(45) Date of Patent: Nov. 16, 2021

(54) SECURE PAIRING OF A PROCESSOR AND A SECURE ELEMENT OF AN ELECTRONIC DEVICE

(71) Applicant: Apple Inc., Cupertino, CA (US)

(72) Inventors: Ahmer A. Khan, Cupertino, CA (US); Jerrold V. Hauck, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 14/475,308

(22) Filed: Sep. 2, 2014

(65) Prior Publication Data

US 2016/0344710 A1 Nov. 24, 2016

(51) Int. Cl.
*H04L 9/00* (2006.01)
*H04L 29/06* (2006.01)

(52) U.S. Cl.
CPC ........ *H04L 63/061* (2013.01); *H04L 63/0492* (2013.01)

(58) Field of Classification Search
CPC ............................ H04L 63/061; H04L 63/166
See application file for complete search history.

(56) References Cited

U.S. PATENT DOCUMENTS

| | | | |
|---|---|---|---|
| 9,317,704 B2 * | 4/2016 | Brudnicki | H04L 63/102 |
| 2012/0102334 A1 * | 4/2012 | O'Loughlin | G06F 12/1408 |
| | | | 713/189 |
| 2012/0130838 A1 * | 5/2012 | Koh | G06Q 20/352 |
| | | | 705/26.1 |
| 2013/0304651 A1 * | 11/2013 | Smith | G06Q 20/3227 |
| | | | 705/67 |
| 2013/0318508 A1 * | 11/2013 | Eo | G06F 9/45512 |
| | | | 717/139 |
| 2014/0245406 A1 * | 8/2014 | Warnez | G06F 21/77 |
| | | | 726/5 |
| 2015/0142669 A1 * | 5/2015 | Landrok | G06Q 20/351 |
| | | | 705/71 |

FOREIGN PATENT DOCUMENTS

WO WO-2007104755 A1 * 9/2007 ............ H04W 12/50

OTHER PUBLICATIONS

Edmond Holohan; Michael Schukat; "Authentication Using Virtual Certificate Authorities: A New Security Paradigm for Wireless Sensor Networks"; 2010 Ninth IEEE International Symposium on Network Computing and Applications; Year: Nov. 2010; Conference Paper; Publisher: IEEE; pp. 92-99 (Year: 2010).*

(Continued)

*Primary Examiner* — Shewaye Gelagay
*Assistant Examiner* — Courtney D Fields
(74) *Attorney, Agent, or Firm* — Morgan, Lewis & Bockius LLP

(57) ABSTRACT

Systems, methods, and computer-readable media for securely pairing a secure element and a processor of an electronic device are provided. In one example embodiment, a method, at an electronic device, includes, inter alia, deriving a key using a processor of the electronic device, sharing the derived key with a commercial entity subsystem, and receiving the shared key from the commercial entity subsystem at a secure element of the electronic device, where the received key may be leveraged for enabling a secure communication channel between the processor and the secure element. Additional embodiments are also provided.

28 Claims, 8 Drawing Sheets

(56) References Cited

OTHER PUBLICATIONS

GlobalPlatform Card Technology, Secure Channel Protocol 03, Card Specification, Version 2.2, Amendment D, Version 1.1, Sep. 2009, 29 pages.
GlobalPlatform Card, Confidential Card Content Management, Card Specification, Version 2.2, Amendment A, Version 1.0.1, Jan. 2011, 26 pages.
GlobalPlatform Card, Contactless Services, Card Specification, Version 2.2, Amendment C, Version 1.0.1, Feb. 2012, 104 pages.
GlobalPlatform Card, Security Upgrade for Card Content Management, Card Specification, Version 2.2, Amendment E, Version 1.0, Nov. 2011, 35 pages.
Globalplatform, Card Specification, Version 2.2, Mar. 2006, 375 pages.
Globalplatform, Card Specification, Version 2.2.1, Jan. 2011, 303 pages.

* cited by examiner

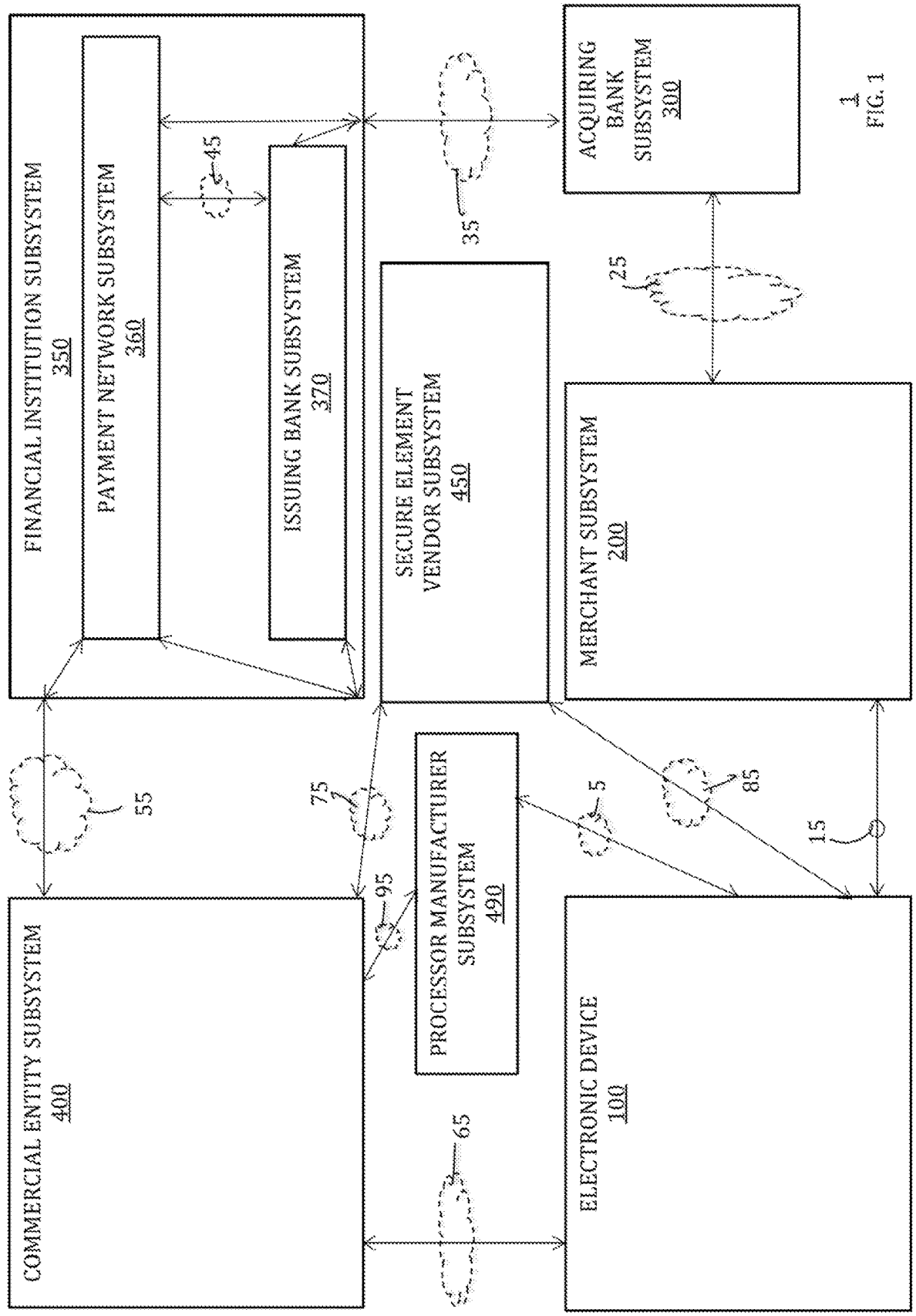

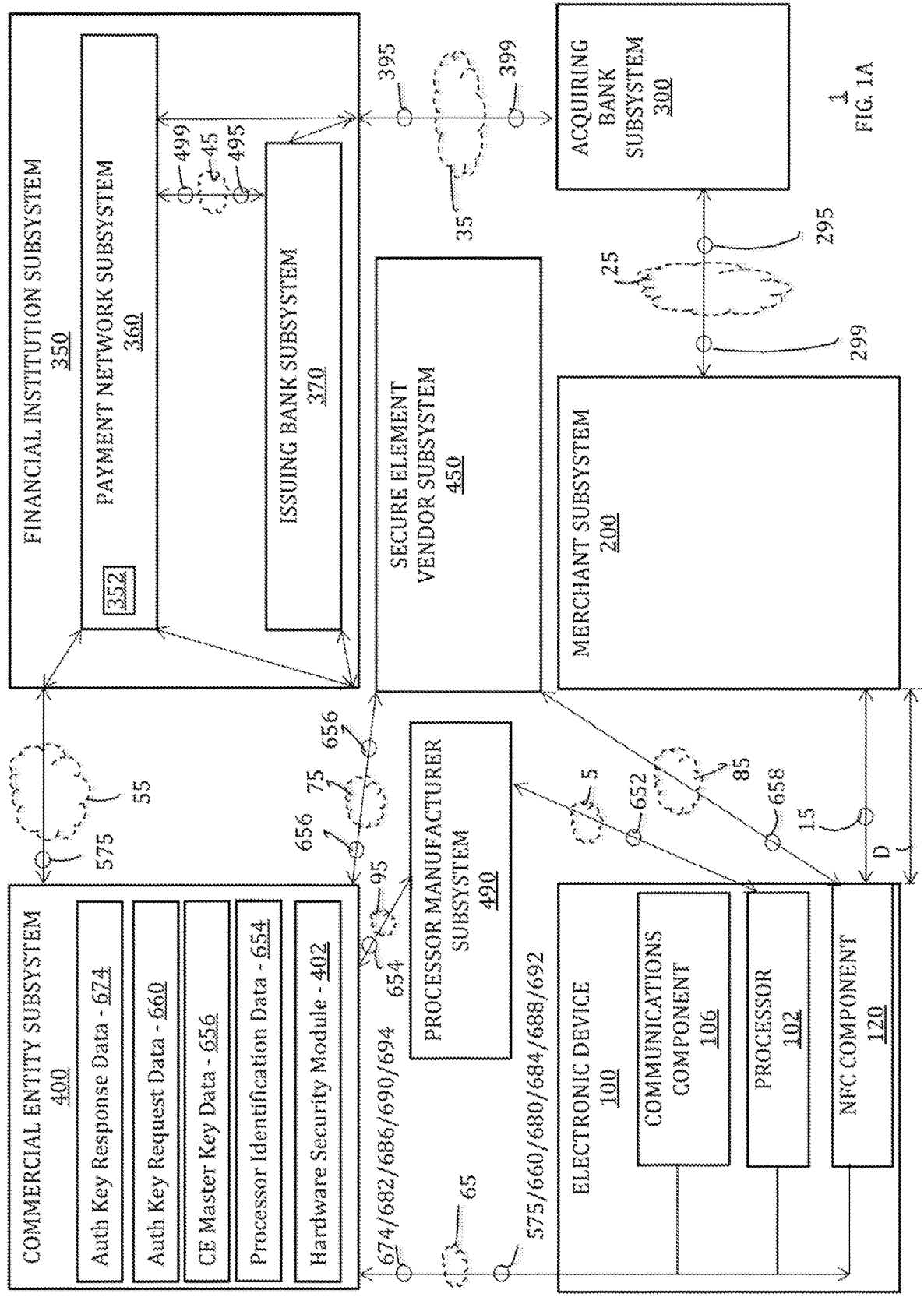

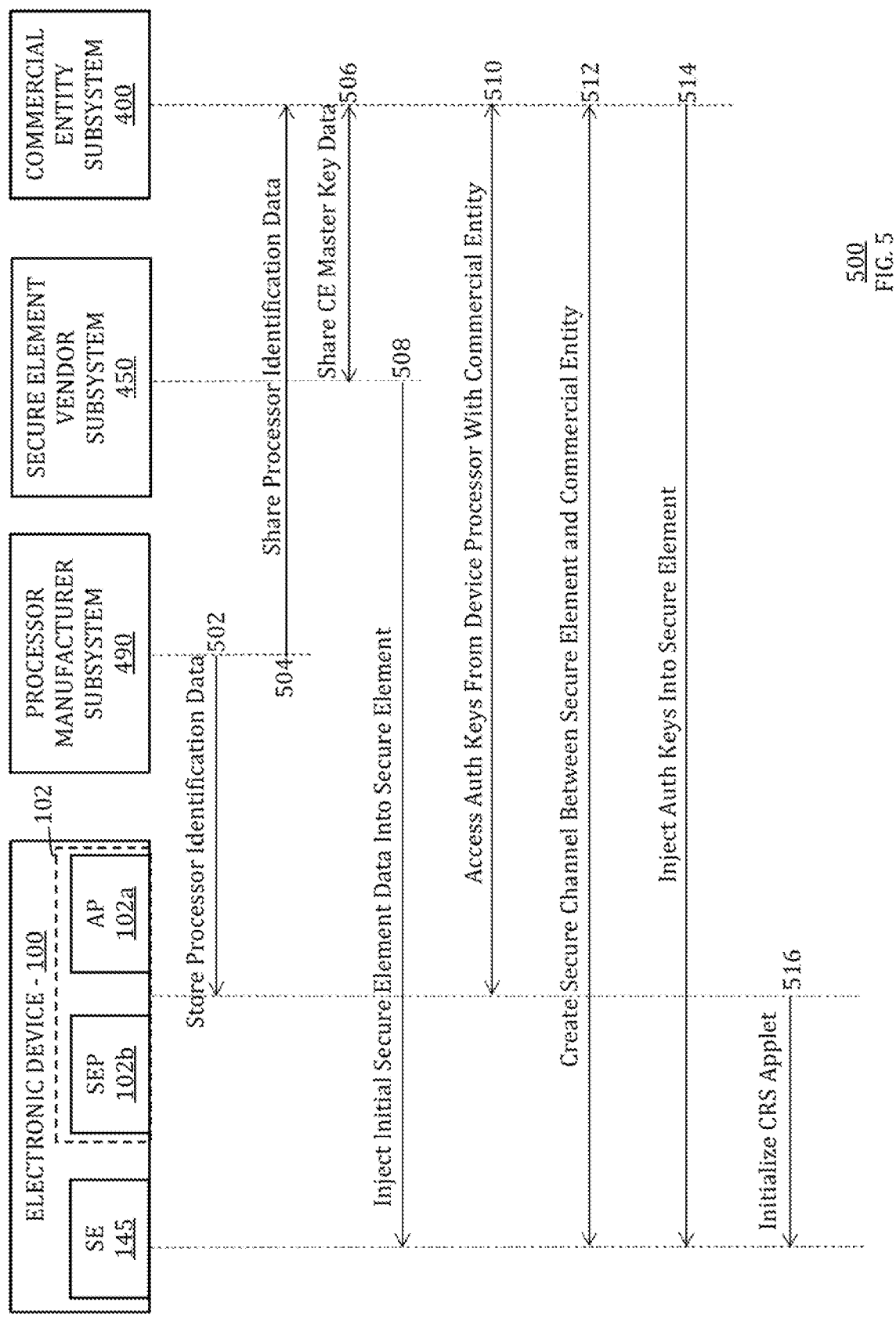

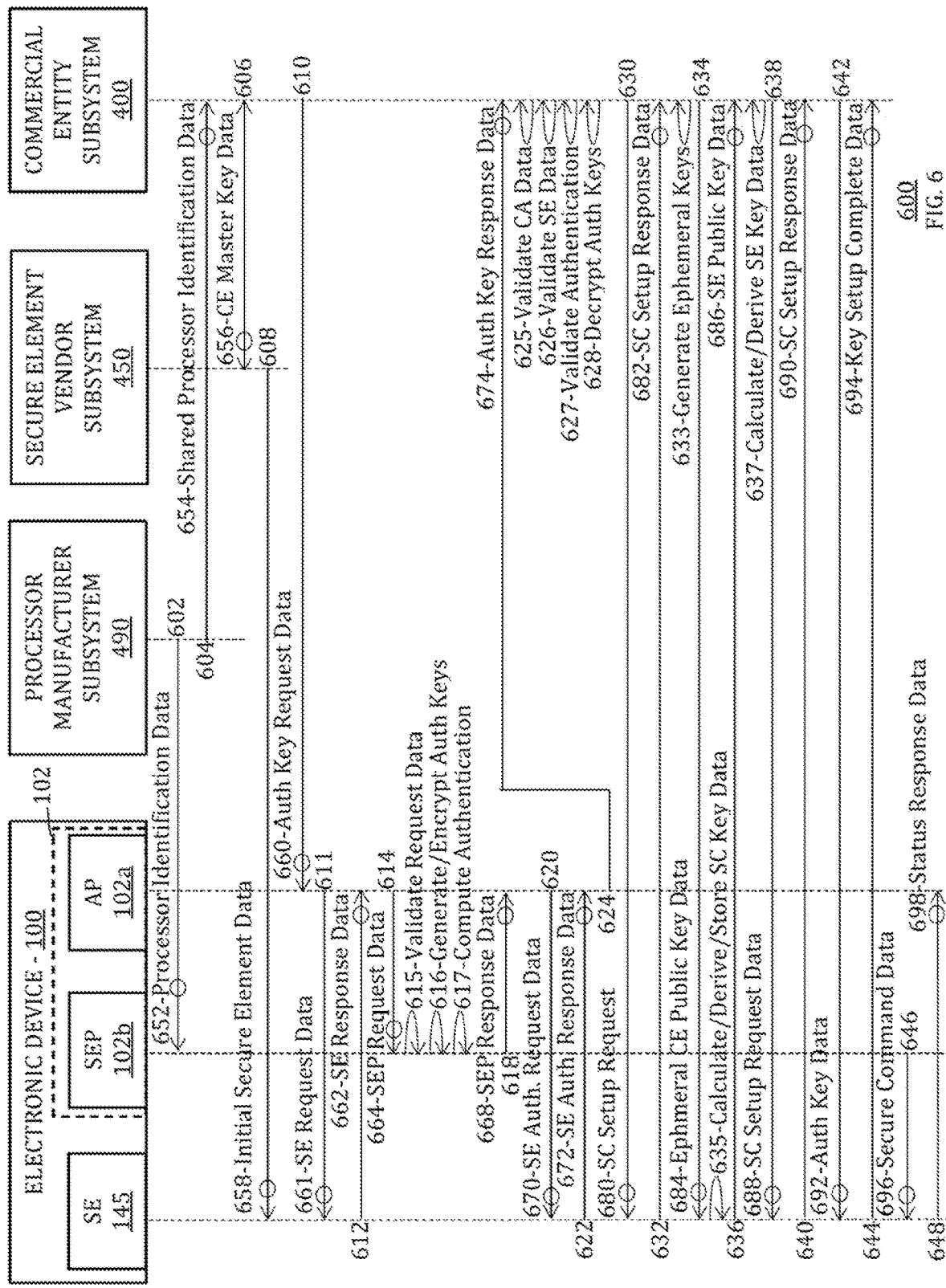

```
┌─────────────────────────────────────────┐
│ ACCESSING, AT A COMMERCIAL ENTITY SUBSYSTEM, A KEY FROM A │
│ PROCESSOR OF AN ELECTRONIC DEVICE        │
│ 702                                      │
└─────────────────────────────────────────┘
                    ↓
┌─────────────────────────────────────────┐
│ INJECTING, AT THE COMMERCIAL ENTITY SUBSYSTEM, THE ACCESSED │
│ KEY INTO A SECURE ELEMENT OF THE ELECTRONIC DEVICE │
│ 704                                      │
└─────────────────────────────────────────┘

700
FIG. 7
```

```
┌─────────────────────────────────────────┐
│ DERIVING, AT THE ELECTRONIC DEVICE, A KEY USING A PROCESSOR OF │
│ THE ELECTRONIC DEVICE                    │
│ 802                                      │
└─────────────────────────────────────────┘
                    ↓
┌─────────────────────────────────────────┐
│ SHARING, AT THE ELECTRONIC DEVICE, THE DERIVED KEY WITH A │
│ COMMERCIAL ENTITY SUBSYSTEM              │
│ 804                                      │
└─────────────────────────────────────────┘
                    ↓
┌─────────────────────────────────────────┐
│ RECEIVING, AT A SECURE ELEMENT OF THE ELECTRONIC DEVICE, THE │
│ SHARED KEY FROM THE COMMERCIAL ENTITY SUBSYSTEM │
│ 806                                      │
└─────────────────────────────────────────┘

SECURE PAIRING OF A PROCESSOR AND A SECURE ELEMENT OF AN ELECTRONIC DEVICE

TECHNICAL FIELD

This disclosure relates to the secure pairing of a processor and a secure element of an electronic device and, more particularly, to the secure pairing of a processor and a secure element of an electronic device using shared keys.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential, with the other entity in a contactless proximity-based communication. However, secure communication between a processor of the electronic device and a secure element that stores such commerce credentials on the electronic device has heretofore been infeasible.

SUMMARY OF THE DISCLOSURE

This document describes systems, methods, and computer-readable media for securely pairing a secure element and a processor of an electronic device.

As an example, a method may include, at a commercial entity subsystem, accessing a key from a processor of an electronic device, and injecting the accessed key into a secure element of the electronic device.

As another example a method may include, at an electronic device, deriving a key using a processor of the electronic device, sharing the derived key with a commercial entity subsystem, and receiving the shared key from the commercial entity subsystem at a secure element of the electronic device.

As another example, an electronic device may include a processor component and a secure element, wherein the processor component is operative to derive a key, wherein the processor component is further operative to share the derived key with a commercial entity subsystem, and wherein the secure element is operative to receive the shared key from the commercial entity subsystem.

As yet another example, a non-transitory computer-readable medium may include computer-readable instructions recorded thereon for accessing a key at a commercial entity subsystem from a processor of an electronic device, and injecting the accessed key from the commercial entity subsystem into a secure element of the electronic device.

As yet another example, a system may include a processor manufacturer subsystem, a secure element vendor subsystem, and a commercial entity subsystem, wherein the processor manufacturer subsystem stores processor identifier data on a processor, the processor manufacturer subsystem shares at least a portion of the processor identifier data with the commercial entity subsystem, the secure element vendor subsystem shares a master transport key with the commercial entity subsystem, the secure element vendor subsystem derives a secure transport key using the master transport key and secure element identifier data, the secure element vendor subsystem stores the secure transport key and the secure element identifier data on a secure element, the commercial entity subsystem produces an electronic device including the processor and the secure element, the commercial entity subsystem accesses an authorization key from the processor of the electronic device, and the commercial entity subsystem injects the accessed authorization key into the secure element of the electronic device.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1 is a schematic view of an illustrative system for securely pairing a secure element and a processor of an electronic device;

FIG. 1A is another more detailed schematic view of the system of FIG. 1;

FIGS. 5-8 are flowcharts of illustrative processes for securely pairing a secure element and a processor of an electronic device.

DETAILED DESCRIPTION OF THE DISCLOSURE

A commercial entity subsystem, such as a producer of electronic devices, may securely pair a processor and a secure element of an electronic device by accessing an authorization key derived by the processor and injecting that accessed authorization key into the secure element, such that the authorization key may be shared by both the processor and the secure element for enabling a secure communication channel between the processor and the secure element. The authorization key may be derived by the processor using both a processor identifier that may be stored in the processor by a processor manufacturer as well as a secure element identifier that may be stored in the secure element by a secure element vendor. A secure transport key may also be stored in the secure element by the secure element vendor, where such a secure transport key may be derived by the secure element identifier and a master transport key, and where such a master transport key may be shared between the secure element vendor and the commercial entity subsystem. The commercial entity subsystem may leverage the master transport key to enable a secure communication channel between the commercial entity subsystem and the secure element, where such a secure communication channel may be used to securely inject the accessed authorization key into the secure element.

Figure 2:
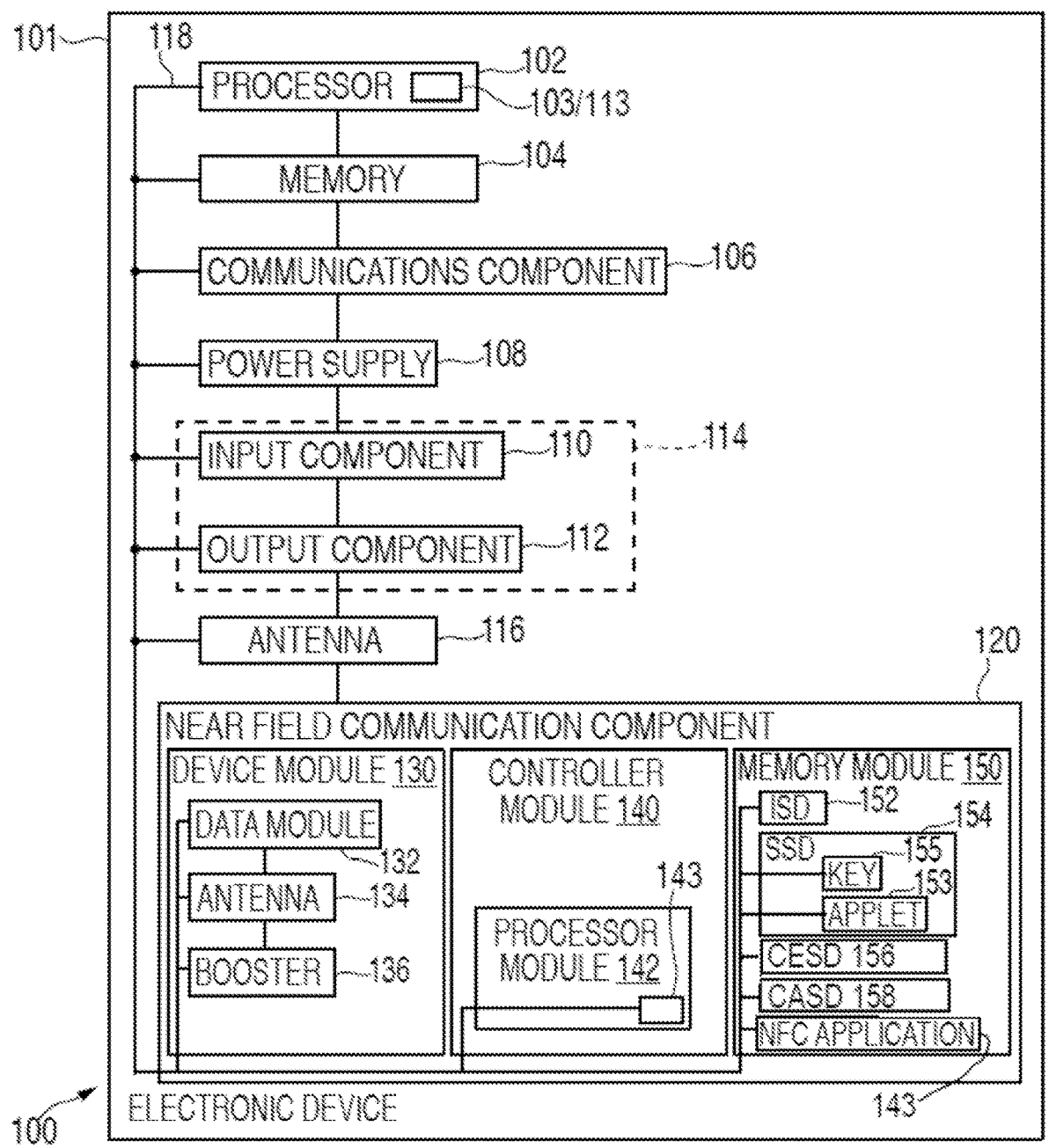
FIG. 2 is a more detailed schematic view of the electronic device of the system of FIGS. 1 and 1A.
Figure 3:
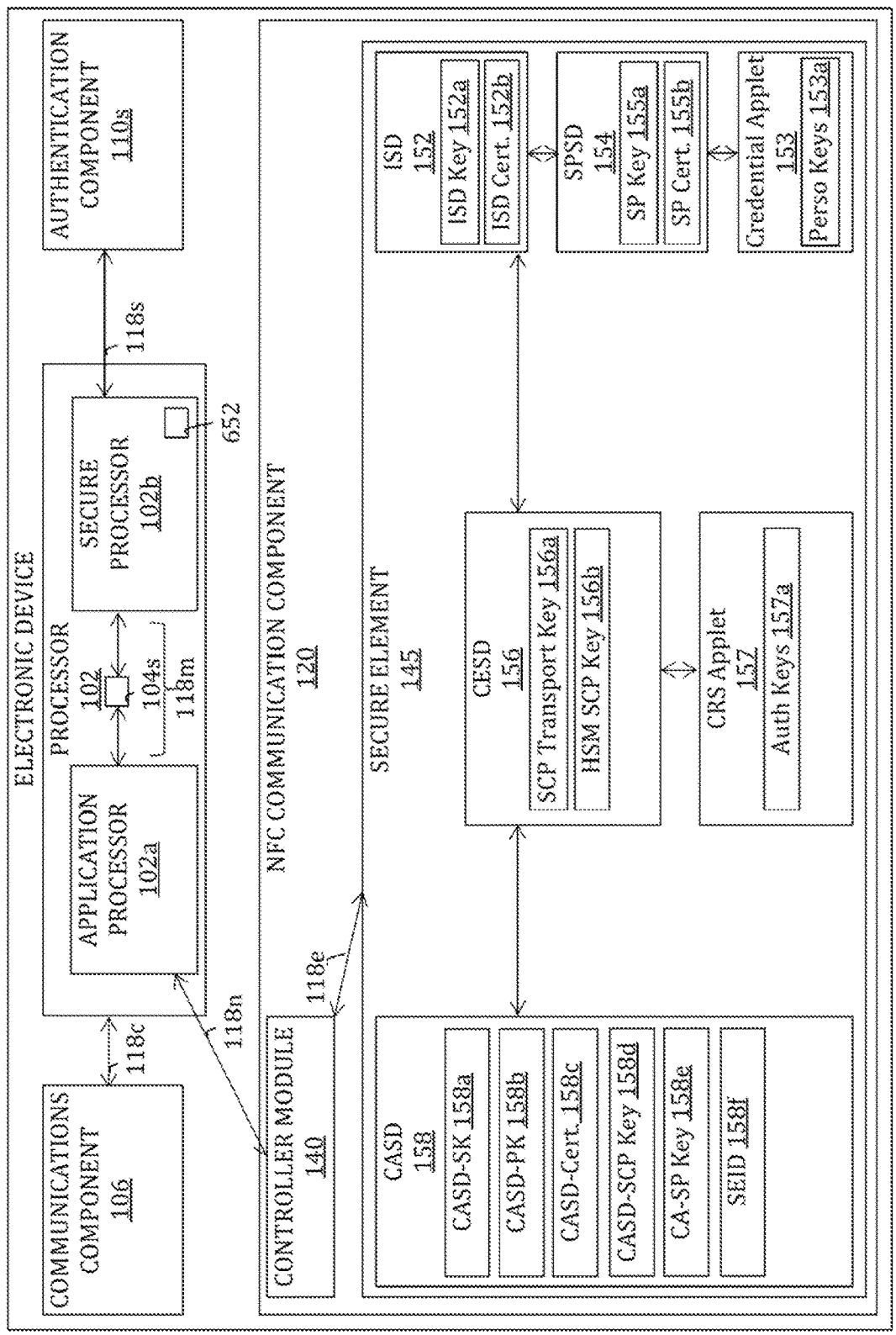
FIG. 3 is another more detailed schematic view of the electronic device of FIGS. 1-2.
Figure 4:
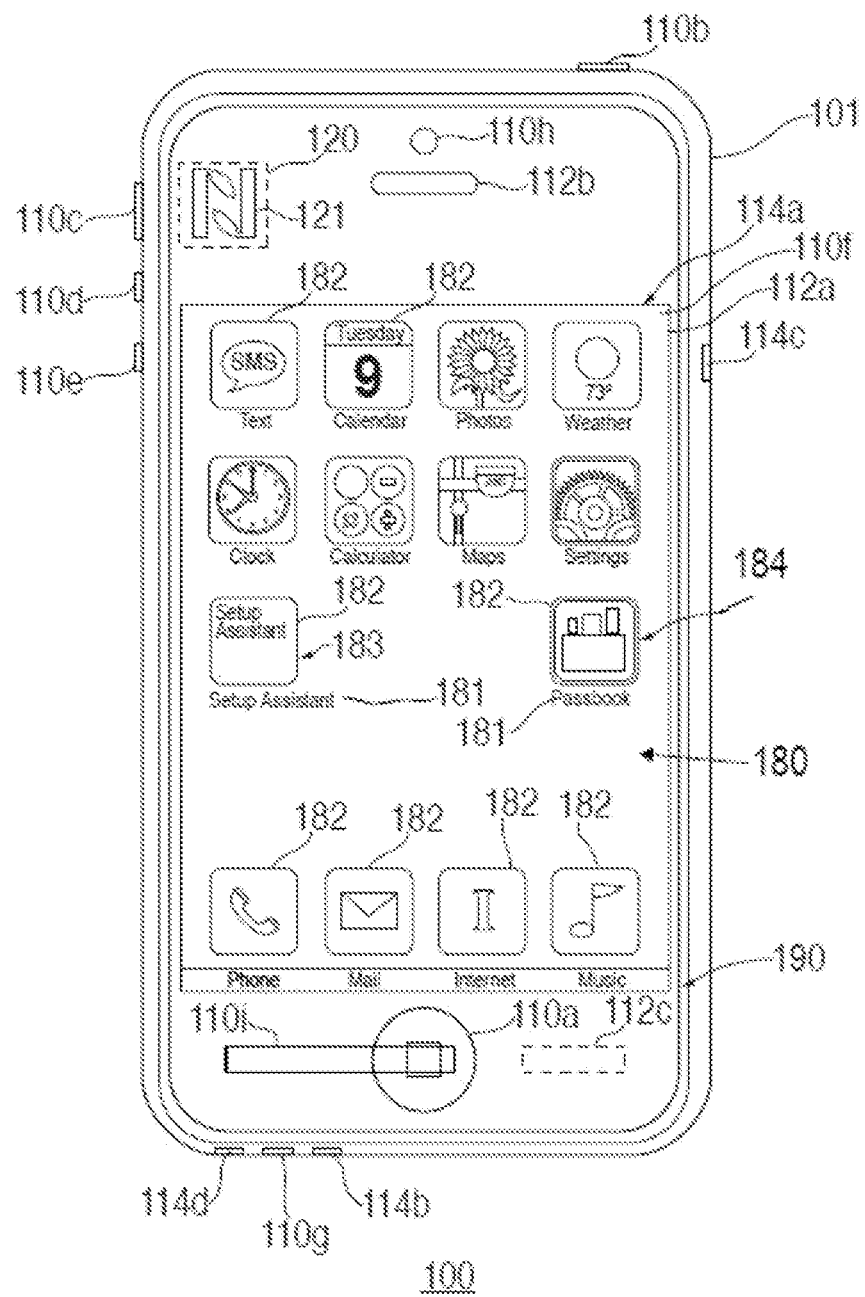
FIG. 4 is a front view of the electronic device of FIGS. 1-3.

FIGS. 1 and 1A show a system 1 in which an electronic device 100 may be provided with a processor by a processor manufacturer subsystem 490 and a secure element by a secure element vendor subsystem 450, in which a commercial entity subsystem 400 may communicate with each one of electronic device 100, secure element vendor subsystem 450, and processor manufacturer subsystem 490 for securely pairing the processor and the secure element of electronic device 100, in which one or more credentials may be provisioned onto the secure element of electronic device 100 from a financial institution subsystem 350 in conjunction with commercial entity subsystem 400, and in which such credentials may be used by electronic device 100 for conducting a financial transaction with a merchant subsystem 200 and an associated acquiring bank subsystem 300. FIGS. 2-4 show further details with respect to particular embodiments of electronic device 100 of system 1 and FIGS. 5-8 are flowcharts of illustrative processes for securely pairing the processor and the secure element of electronic device 100.

Description of FIG. 1

FIG. 1 is a schematic view of an illustrative system 1 that may allow for secure pairing of a processor and a secure element on an electronic device for use in the provisioning of a credential onto the electronic device and/or for use in sharing such a credential in a financial transaction. For example, as shown in FIG. 1, system 1 may include an end-user electronic device 100 as well as a secure element vendor subsystem 450 and a processor manufacturer subsystem 490 for respectively providing a secure element and a processor on electronic device 100. Moreover, as shown in FIG. 1, system 1 may also include a commercial entity subsystem 400 for securely pairing such a secure element and such a processor of electronic device 100. System 1 may also include a financial institution subsystem 350 for securely provisioning one or more credentials on such a secure element of electronic device 100. Moreover, as shown in FIG. 1, system 1 may also include a merchant subsystem 200 for receiving contactless proximity-based communications 15 (e.g., near field communications) from electronic device 100 for enabling payments between a user of electronic device 100 and a merchant of merchant subsystem 200 based on such a provisioned credential. System 1 may also include an acquiring bank subsystem 300 that may utilize such contactless proximity-based communications 15 received by merchant subsystem 200 for completing a financial transaction with financial institution subsystem 350.

System 1 may include a communications path 5 for enabling communication between processor manufacturer subsystem 490 and electronic device 100, a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and electronic device 100, a communications path 75 for enabling communication between commercial entity subsystem 400 and secure element vendor subsystem 450, a communications path 85 for enabling communication between secure element vendor subsystem 450 and electronic device 100, a communications path 95 for enabling communication between processor manufacturer subsystem 490 and commercial entity subsystem 400. One or more of paths 5, 25, 35, 45, 55, 65, 75, 85, and 95 may be at least partially managed by one or more trusted service managers ("TSMs"). Any suitable circuitry, device, system, or combination of these (e.g., a wireless communications infrastructure including one or more communications towers, telecommunications servers, or the like) operative to create a communications network may be used to provide one or more of paths 5, 25, 35, 45, 55, 65, 75, 85, and 95, which may be capable of providing communications using any suitable wired or wireless communications protocol. For example, one or more of paths 5, 25, 35, 45, 55, 65, 75, 85, and 95 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 1A

Referring now to FIG. 1A, FIG. 1A shows a more detailed view of the system 1 described above with respect to FIG. 1. As shown in FIG. 1A, for example, electronic device 100 may include a processor 102, a communications component 106, and/or a near field communication ("NFC") component 120. NFC component 120 may include a secure element that may be configured to provide a tamper-resistant platform (e.g., as a single or multiple chip secure microcontroller) that may be capable of securely hosting applications and their confidential and cryptographic data (e.g., supplemental security domains ("SSDs") with credential applets, associated credential keys (e.g., credential keys 153a), and associated domain access keys (e.g., domain access keys 155a), an issuer security domain ("ISD") key (e.g., ISD key 152a), keys of a contactless registry services ("CRS") applet of a commercial entity security domain ("CESD") (e.g., one or more of a secure channel protocol ("SCP") transport key 156a, a hardware security module ("HSM") SCP key 156b, and Auth Keys 157a), and/or keys of a controlling authority security domain ("CASD") (e.g., one or more of CASD-SK key 158a, CASD-PK 158b, CASD-Cert. 158c, CASD-SCP key 158d, and/or CA-SP key 158e), one or more of which may be in accordance with rules and security requirements that may be set forth by a set of well-identified trusted authorities (e.g., an authority of financial institution subsystem and/or an industry standard, such as GlobalPlatform). As described below in more detail, a credential applet of NFC component 120 may be configured to provide sufficient detail for identifying a finding account or other financial instrument or credit source, where information from such a credential applet may be used by electronic device 100 in one or more communications with merchant subsystem 200 for facilitating a financial transaction. NFC component 120 may be configured to communicate such credential information as a contactless proximity-based communication 15 (e.g., near field communication) with merchant subsystem 200 (e.g., with a merchant terminal (not shown) of merchant subsystem 200) to conduct a financial transaction. Alternatively or additionally, communications component 106 may be provided to allow device 100 to communicate any suitable data (e.g., credential information) with one or more other electronic devices or servers or subsystems (e.g., one or more subsystems or other components of system 1) using any suitable wired or wireless protocol (e.g., via one or more of communications paths 55 and/or 65). Processor 102 of electronic device 100 may include any processing circuitry that may be operative to control the operations and performance of one or more components of electronic device 100. For example, processor 102 may be configured to run one or more applications on device 100 (e.g., an online resource application) that may at least partially dictate the way in which one or more credentials may be managed on a secure element of NFC component 120 and/or credential data may be communicated between communications component 106 of device 100 and other entities of system 1 (e.g., a merchant server (not shown) of a merchant subsystem 200, commercial entity subsystem 400, and/or financial entity subsystem 350) over the internet or any other suitable network that may be provided by communications paths 65 or otherwise.

As mentioned, merchant subsystem 200 may include a reader or terminal (not shown) for detecting, reading, or otherwise receiving NFC communications 15 from electronic device 100 (e.g., when electronic device 100 comes within a certain distance or proximity D of the merchant terminal). Such a merchant terminal may be located at a brick and mortar store or any physical location at which a user of electronic device 100 may use a credential stored on NFC component 120 of electronic device 100 to conduct a financial transaction with a proximately located merchant terminal via a contactless proximity-based communication 15. Although not shown in FIG. 1A, but as described below in more detail, merchant subsystem 200 may also include a merchant processor component that may be the same as or similar to a processor component 102 of electronic device 100, a merchant application that may be the same as or similar to an application of electronic device 100, a merchant communications component that may be the same as or similar to a communications component 106 of electronic device 100, a merchant input/output ("I/O") interface that may be the same as or similar to an I/O interface of electronic device 100, a merchant bus that may be the same as or similar to a bus of electronic device 100, a merchant memory component that may be the same as or similar to a memory component of electronic device 100, and/or a merchant power supply component that may be the same as or similar to a power supply component of electronic device 100.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 may be associated with a specific payment card that may be electronically linked to an account or accounts of a particular user at financial institution subsystem 350. Various types of payment cards are suitable, including credit cards, debit cards, charge cards, stored-value cards, fleet cards, gift cards, and the like. The commerce credential of a specific payment card may be provisioned on electronic device 100 (e.g., as a credential of a credential SSD of NFC component 120, as described below) by financial institution subsystem 350 for use in a commerce credential data communication (e.g., a contactless proximity-based communication 15) with merchant subsystem 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand.

When a credential of a secure element of device 100 is appropriately provided as a commerce credential data communication to merchant subsystem 200 (e.g., as a contactless proximity-based communication 15 to a merchant terminal), merchant subsystem 200 may leverage acquiring bank subsystem 300 and/or financial institution subsystem 350 for completing a financial transaction based on that commerce credential data communication. For example, after a user of electronic device 100 has chosen a product for purchase and has appropriately enabled a specific credential of device 100 to be used for payment, merchant subsystem 200 may receive an appropriate commerce credential data communication 15 indicative of commerce credential data for the specific credential. Based on such a received commerce credential data communication 15, merchant subsystem 200 may be configured to generate and transmit data 295 to acquiring bank subsystem 300 (e.g., via a communication path 25 between merchant subsystem 200 and acquiring bank subsystem 300), where data 295 may include payment information and an authorization request that may be indicative of the user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via a commerce credential data communication with merchant subsystem 200 (e.g., via a contactless proximity-based communication 15). Acquiring bank subsystem 300 may then forward the authorization request from data 295 to financial institution subsystem 350 as data 395 (e.g., via a communication path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as a payment network subsystem 360 and/or an issuing bank subsystem 370. One, some, or all components of acquiring bank subsystem 300 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100.

In the case of payment network subsystem 360 and issuing bank subsystem 370 being separate entities, payment network subsystem 360 may receive the authorization request of data 395 from acquiring bank subsystem 300 and may then forward the request to issuing bank subsystem 370 as data 495 (e.g., via a communication path 45 between payment network subsystem 360 and issuing bank subsystem 370). In the case of payment network subsystem 360 and issuing bank subsystem 370 being the same entity, acquiring bank subsystem 300 may submit the authorization request of data 395 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 395 or indirectly via payment network subsystem 360 as data 495), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 399 (e.g., authorization response data 399 may be provided directly from issuing bank subsystem 370 to acquiring bank subsystem 300 via communication path 35, or authorization response data 399 may be provided from payment network subsystem 360 to acquiring bank subsystem 300 based on authorization response data 499 that may be provided to payment network subsystem 360 from issuing bank subsystem 370 via communication path 45). Appropriate authorization response data 299 may be generated and transmitted by acquiring bank subsystem 300 to merchant subsystem 200 (e.g., via communications path 25) based on authorization response data 399 so as to alert merchant subsystem 200 of the status of the financial transaction, which may then be communicated to device 100.

In order for such financial transactions to occur within system 1, at least one commerce credential must first be securely provisioned on a secure element of electronic device 100 (e.g., as a portion of a credential SSD of NFC component 120). For example, such a commerce credential may be at least partially provisioned on a secure element of NFC component 120 of electronic device 100 directly from financial institution subsystem 350 (e.g., as credential pass data via a communication path (not shown) between financial institution subsystem 350 and device 100, which may be passed to NFC component 120 via communications component 106). Additionally or alternatively, such a commerce credential may be at least partially provisioned on a secure element of NFC component 120 of electronic device 100 from financial institution subsystem 350 via commercial entity subsystem 400 (e.g., as credential pass data 575 via a communication path 55 between financial institution subsystem 350 and commercial entity subsystem 400, which may then be passed to device 100 as credential pass data 575 via a communication path 65 between a server of commercial entity subsystem 400 and communications component 106 of device 100, which may then be passed to NFC component 120 from communications component 106). Credential pass data 575 may be provisioned on a secure element of device 100 as at least a portion or all of a credential SSD and may include a credential applet and/or a credential key, as described below in more detail. Financial institution subsystem 350 may also have access to a credential key for each credential it provisions. Financial institution subsystem 350 may be responsible for management of credential keys, which may include the generation, exchange, storage, use, and replacement of such keys. Financial institution subsystem 350 may store its version of each credential key in a secure element of financial institution subsystem 350.

The credential data that may be provisioned on device 100 may include all data necessary to make a payment with that credential, such as, for example, a primary account number ("PAN"), a card security code (e.g., a card verification code ("CVV")), expiration date, name associated with the credential, and/or the like. A "virtual" credential or virtual PAN or device PAN ("D-PAN") may be provisioned on device 100 rather than the user's "actual" credential or actual PAN or funding PAN ("F-PAN"). For example, once it is determined that a credential is to be provisioned on device 100, it may be requested (e.g., by financial institution subsystem 350, by commercial entity subsystem 400, and/or by a user of device 100) that a virtual credential be generated, linked to the actual credential, and provisioned on device 100 instead of the actual credential. Such creation and linking of a virtual credential with an actual credential may be performed by any suitable component of financial institution subsystem 350. For example, a payment network subsystem 360 (e.g., a particular payment network subsystem 360 that may be associated with the brand of the actual credential) may define and store a virtual-linking table 352 (e.g., as shown in FIG. 1A) that may create associations between the actual credential and a virtual credential, such that anytime a virtual credential is utilized by device 100 for a financial transaction with merchant subsystem 200 (e.g., after being provisioned on device 100), payment network subsystem 360 may receive an authorization request indicative of that virtual credential (e.g., as data 395 of FIG. 1A) and may conduct an analysis of that authorization request in light of the actual credential associated with the virtual credential as determined by table 352. By provisioning a virtual credential on device 100 rather than an actual credential, financial institution subsystem 350 may be configured to limit the fraudulent activity that may result when the virtual credential is intercepted by an unauthorized user, as payment network subsystem 360 may only be configured to utilize table 352 for linking the virtual credential to the actual credential during certain transactions.

Commercial entity subsystem 400 may be provided as an intermediary between electronic device 100 and financial institution subsystem 350, where commercial entity subsystem 400 may be configured to provide a new layer of security and/or to provide a more seamless user experience when a credential is being provisioned or otherwise managed on a secure element of device 100. Commercial entity subsystem 400 may be provided by a specific commercial entity that may offer various services to a user of device 100, for example, via user-specific log-in information to a user-specific account with that commercial entity (e.g., via user-specific identification and password combinations). As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™ iPhone™, or the like). The commercial entity that may provide commercial entity subsystem 400 (e.g., Apple Inc.) may be distinct and independent from any financial entity of financial institution subsystem 350. For example, the commercial entity that may provide commercial entity subsystem 400 may be distinct and independent from any entity that may furnish or otherwise mange a bank server, any entity that may furnish or otherwise manage a third party application 113, any entity that may furnish or otherwise mange payment network subsystem 360, and/or any entity that may furnish or otherwise mange issuing bank subsystem 370, which may furnish and/or manage any credit card or other commerce credential provisioned on user device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and independent from any merchant of merchant subsystem 200 that may provide a merchant terminal or any other aspect of merchant subsystem 200. Such a commercial entity may leverage its potential ability to configure or control various components of device 100 (e.g., software and/or hardware components of device 100 when that commercial entity at least partially produces or manages device 100) in order to provide a more seamless user experience for a user of device 100 when he or she wants to provision or otherwise manage a credential offered by financial institution subsystem 350 on user device 100. For example, in some embodiments, device 100 may be configured to communicate with commercial entity subsystem 400 seamlessly and transparently to a user of device 100 (e.g., via communications path 65) for sharing or receiving certain data that may enable a higher level of security (e.g., during provisioning or other suitable management of one or more credentials on a secure element of device 100, for example, while using an online resource, such as application 113).

Commercial entity subsystem 400 may be a secure platform system and, although not shown in FIGS. 1 and 1A, may include a secure mobile platform ("SMP") broker component, an SMP trusted services manager ("TSM") component, an SMP crypto services component, an identity management system ("IDMS") component, a fraud system component, a hardware security module ("HSM") component, and/or a store component, as described in more detail below. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience when provisioning credentials on device 100.

A third-party vendor may generate at least a portion of a secure element that may be provisioned on electronic device 100. As shown in FIGS. 1 and 1A, secure element vendor subsystem 450 may be provided within system 1, where secure element vendor subsystem 450 may be configured to fabricate at least a portion of a secure element (e.g., secure element 145 described below) that may later be embedded or otherwise included as a part of electronic device 100 (e.g., by a manufacturer of the majority of device 100, such as Apple Inc., which may be represented by commercial entity subsystem 400). Secure element vendor subsystem 450 may be provided by a specific vendor entity that may offer various services and/or products to a manufacturer of device 100. As just one example, secure element vendor subsystem 450 may be provided NXP Semiconductors of Eindhoven, Netherlands. Secure element vendor subsystem 450 may be a secure platform system and, although not shown in FIGS. 1 and 1A, may include a secure mobile platform ("SMP") broker component, an SMP trusted services manager ("TSM") component, an SMP crypto services component, an identity management system ("IDMS") component, a fraud system component, a hardware security module ("HSM") component, and/or a store component, as described in more detail below. One, some, or all components of secure element vendor subsystem 450 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of secure element vendor subsystem 450 may be managed by, owned by, at least partially controlled by, and/or otherwise provided by a single vendor entity (e.g., NXP Semiconductor) that may be distinct and/or independent from an entity that may manage, own, control, and/or otherwise provide commercial entity subsystem 400 (e.g., Apple Inc.). Additionally or alternatively, one, some, or all components of secure element vendor subsystem 450 may be managed by, owned by, at least partially controlled by, and/or otherwise provided by a single vendor entity that may be distinct and/or independent from an entity that may manage, own, control, and/or otherwise provide financial institution subsystem 350. The components of secure element vendor subsystem 450 may interact with each other and collectively with both commercial entity subsystem 400 and electronic device 100 for preparing at least a portion of secure element 145 for use on electronic device 100.

A third-party manufacturer may generate at least a portion of a processor or system on a chip ("SoC") that may be provisioned on electronic device 100. As shown in FIGS. 1 and 1A, processor manufacturer subsystem 490 may be provided within system 1, where processor manufacturer subsystem 490 may be configured to fabricate at least a portion of a processor (e.g., processor 102 described below) that may later be embedded or otherwise included as a part of electronic device 100 (e.g., by a manufacturer of the majority of device 100, such as Apple Inc., which may be represented by commercial entity subsystem 400). Processor manufacturer subsystem 490 may be provided by a specific manufacturer entity that may offer various services and/or products to a manufacturer of device 100. As just one example, processor manufacturer subsystem 490 may be provided NXP Semiconductors of Eindhoven, Netherlands, Intel of Santa Clara, Calif., or Apple Inc. of Cupertino, Calif. Processor manufacturer subsystem 490 may be a secure platform system. One, some, or all components of processor manufacturer subsystem 490 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of processor manufacturer subsystem 490 may be managed by, owned by, at least partially controlled by, and/or otherwise provided by a single vendor entity that may be the same as or distinct and/or independent from an entity that may manage, own, control, and/or otherwise provide commercial entity subsystem 400 (e.g., Apple Inc.). Additionally or alternatively, one, some, or all components of processor manufacturer subsystem 490 may be managed by, owned by, at least partially controlled by, and/or otherwise provided by a single vendor entity that may be distinct and/or independent from an entity that may manage, own, control, and/or otherwise provide financial institution subsystem 350. The components of processor manufacturer subsystem 490 may interact with each other and collectively with both commercial entity subsystem 400 and electronic device 100 for preparing at least a portion of processor 102 for use on electronic device 100.

Description of FIG. 2

Referring now to FIG. 2, FIG. 2 shows a more detailed view of electronic device 100 of system 1 described above with respect to FIGS. 1 and 1A. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1A, processor 102 may be used to run one or more applications, such as an application 103 and/or an application 113. As one example, application 103 may be an operating system application while application 113 may be a third party application (e.g., an application associated with a bank of financial institution subsystem 350).

NFC component 120 may be any suitable proximity-based communication mechanism that may enable any suitable contactless proximity-based transactions or communications 15 between electronic device 100 and merchant subsystem 200 (e.g., a merchant payment terminal of merchant subsystem 200). NFC component 120 may include any suitable modules for enabling contactless proximity-based communication 15 between electronic device 100 and subsystem 200. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a merchant terminal as part of a contactless proximity-based or NFC communication 15. Additionally or alternatively, NFC data module 132 may be configured to contain, route, or otherwise receive any suitable data that may be received by NFC component 120 from a merchant terminal as part of a contactless proximity-based communication 15. NFC controller module 140 may include at least one NFC processor module 142. NFC processor module 142 may operate in conjunction with NFC device module 130 to enable, activate, allow, and/or otherwise control NFC component 120 for communicating NFC communication 15 between electronic device 100 and merchant subsystem 200. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communication 15 between electronic device 100 and merchant subsystem 200. NFC memory module 150 may be tamper resistant and may provide at least a portion of a secure element 145 (see, e.g., FIG. 3). For example, such a secure element 145 may be configured to provide a tamper-resistant platform (e.g., as a single or multiple chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more security domains, such as an issuer security domain ("ISD") 152, a supplemental security domain ("SSD") 154 (e.g., a service provider security domain ("SPSD"), a trusted service manager security domain ("TSMSD"), etc.), a commercial entity security domain ("CESD") 156, and/or a controlling authority security domain ("CASD") 158, one or more of which may be at least partially defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) or commercial entity subsystem (e.g., commercial entity subsystem 400) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. As another example, SSD 154 may be associated with a particular TSM and at least one specific payment or commerce credential (e.g., a specific credit card credential, a specific public transit card credential, a specific reloadable cash credential, etc.) that may provide specific privileges or payment rights to electronic device 100. Each SSD 154 may have one or more of its own manager keys 155 and may include or be associated with at least one of its own credential applications or credential applets (e.g., a Java card applet instances) that may be associated with a particular commerce credential (e.g., a respective payment credential applet 153), where a credential applet may have its own keys (e.g., perso keys) and where a credential applet may need to be activated to enable its associated commerce credential for use by NFC device module 130 as an NFC communication 15 between electronic device 100 and merchant subsystem 200. For example, an applet 153 of an SSD 154 may be an application that may run on a secure element 145 of NFC component 120 (e.g., in a GlobalPlatform environment).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. Each key and applet may be loaded on the secure element of device 100 by a TSM or an authorized agent or pre-loaded on the secure element when first provided on device 100. While credential SSD 154 may be associated with a particular credit card credential, that particular credential may only be communicated as a commerce credential data communication to merchant subsystem 200 (e.g., as a contactless proximity-based communication 15 to a merchant terminal) from a secure element of device 100 (e.g., from NFC component 120) for a financial transaction when applet 153 of that credential SSD 154 has been enabled or otherwise activated or unlocked for such use.

Security features may be provided for enabling use of NFC component 120 that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, a component or any suitable portion of the secure element may be configured to determine intent and local authentication of a user of device 100 (e.g., via one or more input components 110, such as a biometric "touch ID" input component) and, in response to such a determination, may be configured to enable a particular SSD for conducting a payment transaction (e.g., with a credential of credential SSD 154).

Description of FIG. 3

Referring now to FIG. 3, FIG. 3 shows another detailed view of a portion of electronic device 100 of system 1 described above with respect to FIGS. 1-2. As shown in FIG. 3, for example, a secure element 145 of NFC component 120 may include at least one SPSD 154, which may include an SP key 155a and/or an SP Cert. 155b, and/or which may include or be associated with payment credential applet 153, which may include one or more keys, such as Perso Keys 153a. SPSD 154 may have its own SPSD key 155a that may need to be activated to enable a function of that SPSD 154 for use by NFC device module 130. Additionally or alternatively, SPSD 154 may include and/or be associated with at least one of its own payment credential applications or payment credential applets 153 (e.g., a Java card applet instances) associated with a particular commerce credential, where a credential applet may need to be activated to enable its associated commerce credential for use by NFC device module 130 as an NFC communication 15 between electronic device 100 and merchant subsystem 200. In some embodiments, a credential key of a credential applet (e.g., perso keys 153a) may be generated by financial institution subsystem 350 that may be responsible for such a credential and may be accessible by that financial institution subsystem 350 for enabling secure transmission of that credential applet between secure element 145 and financial institution subsystem 350. Additionally or alternatively, a credential key of a credential applet or a key of an associated SPSD may be generated by commercial entity subsystem 400 and may be accessible by commercial entity subsystem 400 for enabling secure transmission of that credential applet between secure element 145 and commercial entity subsystem 400.

Additionally or alternatively, as shown in FIG. 3, secure element 145 may include ISD 152, which may include an ISD key 152a that may also be known to a trusted service manager associated with that security domain. ISD key 152a may be leveraged for enabling secure transmissions between secure element 145 of electronic device 100 and a remote trusted subsystem. Additionally or alternatively, as shown in FIG. 3, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it cannot be inspected or modified by any entity, including an issuer of secure element 145. CASD 158 may be configured to include and/or may be configured to generate and/or otherwise include various security features, such as one or more of CASD-SK(ey) 158a, CASD-PK(ey) 158b, CASD-Cert. 158c, CASD-SCP Key 158d, and/or CA-SP Key 158e. For example, CASD 158 may be configured to sign and/or encrypt certain data on secure element 145 before providing such data to another portion of device 100 (e.g., communications component 106 for sharing with other subsystems of system 1). As an example, CASD 158 may be configured to sign any data that is provided by secure element 145 such that other subsystems (e.g., commercial entity subsystem 400) may be able to confirm that such signed data was signed by secure element 145 (e.g., using associated CASD data at commercial entity subsystem 400). In some embodiments, as described below, secure element vendor subsystem 450 of system 1 may be configured to inject certain keys (e.g., at least CASD-SK(ey) 158a and CASD-PK(ey) 158b) as well as an issued CASD-Cert. 158c into CASD 158 (e.g., at a secure facility of secure element vendor subsystem 450). Keys of CASD 158 may be any suitable keys, such as unique asymmetric elliptic curve cryptography ("ECC") 256 bit key pairs.

Additionally or alternatively, as shown in FIG. 3, secure element 145 may include a commercial entity security domain ("CESD") 156, which may be configured to include one or more of an SCP transport key 156a and/or an HSM SCP key 156b, and/or which may include or be associated with a contactless registry services ("CRS") applet 157, which may be configured to include one or more Auth Keys 157a, as described below in more detail. As described below in more detail with respect to FIGS. 5 and 6, SCP transport key 156a may be a secure-element specific key that may be injected into CESD 156 of secure element 145 by secure element vendor subsystem 450 (e.g., at the time of manufacture of secure element 145), where SCP transport key 156a may be derived based on a unique identification of the secure element (e.g., a secure element ID ("SEID")) and a master transport key (e.g., CE master key data 656 of commercial entity subsystem 400 of FIG. 1) that may be exchanged between commercial entity subsystem 400 (e.g., one or more factory HSMs of commercial entity subsystem 400) and secure element vendor subsystem 450. As also described below in more detail with respect to FIGS. 5 and 6, HSM SCP key 156b may be any suitable key that may be injected by commercial entity subsystem 400 (e.g., by a factory HSMs of commercial entity subsystem 400) during a process for pairing a processor and secure element of device 100. Such injection of HSM SCP key 156b may be loaded using any suitable technique, such as confidential key agreement using ECKA (e.g., elliptic curve key agreement ("ECKA") algorithm (e.g., an elliptic curve key agreement algorithm that may use ElGamal key agreement)), as may be defined in "GlobalPlatform Card, Security Upgrade for Card Content Management, Card Specification, Version 2.2, Amendment E, Version 1.0, November 2011," which is hereby incorporated by reference herein in its entirety. Once HSM SCP key 156b has been loaded in CESD 156, HSM SCP key 156b may be used to securely load one or more Auth Keys 157a on CRS applet 157, using any suitable protocol, such as SCP03 with a 128-key Advanced Encryption Standard ("AES"). An "Auth" key or an "authorization" key or an "authenticated" key, as referred to herein, may be any suitable key or other entity of any suitable type or length or size that may be leveraged for enabling a secure communication channel between a processor and a secure element. In fact, any key of any type referred to herein (e.g., a "transport" key, a "master" key, a "public" key, a "private" key, and the like) may each be any suitable key or other entity of any suitable type or length or size that may be used to reformat or sign or encrypt or decrypt or encode or decode otherwise be leveraged for enabling secure communication of any type.

CRS applet 157 may be configured to provide local functionality and/or management to electronic device, such as for listing the various applets of secure element 145, activating, deactivating, locking, enabling, disabling, or otherwise manipulating a state of one or more of the other applets (e.g., payment credential applet 153) of secure element 145, and the like, as may be defined in "GlobalPlatform Card, Contactless Services, Card Specification, Version 2.2, Amendment C, Version 1.0.1, February 2012," which is hereby incorporated by reference herein in its entirety. CRS applet 157 may be configured as a main interaction point for host side applications (e.g., application 103 and/or application 113) of processor 102 of electronic device 100 to provide such functionality. The functionality of CRS applet 157 may be enhanced to include one or more Auth Keys 157a, which may enable establishment of a secure communication channel with at least a portion of processor 102 (e.g., a secure processor 102b, as described below in more detail) for receiving certain authorizations (e.g., authorizations from secure touch ID components of device 100). Once such authorization is received, CRS applet 157 may be configured to mark certain flags or other suitable portions of secure element 145 as true or otherwise for enabling activation of certain other applets for use (e.g., payment credential applet 153). Additionally or alternatively, CESD 156, which may be associated with and/or may manage or provide access to CRS applet 157, may include one or more keys, such as SCP transport key 156a and/or HSM SCP key 156b, which may be accessible to or otherwise leveraged by a trusted service manager associated with CRS applet 157 (e.g., commercial entity subsystem 400) for enabling certain communications between secure element 145 and a remote entity (e.g., for enabling generation of a secure communication channel between CRS applet 157 and processor 102 (e.g., for injecting Auth Key(s) 157a into CRS applet 157)).

Additionally or alternatively, as shown in FIG. 3, and as described below in more detail, electronic device 100 may include one or more types of processors. For example, device processor 102 may be provided at least by an application provider processor or application processor ("AP") 102a, which may be configured to provide all basic functionality to device 100, such as providing the main processing core for enabling the normal operating system and user interface experience. Additionally, in some embodiments, device 100 may also be provided with a secure enclave processor ("SEP") or secure processor 102b, which may be configured to provide various security-intensive functionality to device 100 (e.g., without undue influence from AP 102a, which may more susceptible than SEP 102b to malware and/or privilege escalation (e.g., "jailbreaking") for operating system or various application exploitation). For example, in some embodiments, AP 102a and SEP 102b may be physically provided on the same die or system on a chip ("SoC"). However, each one of AP 102a and SEP 102b may be provided with its own processing capabilities, its own dedicated-memory areas (e.g., ROM), its own code, and the like. SEP 102b may be provided with its own dedicated processor for performing certain security functions using protected memory regions.

As described below, SEP 102b may be leveraged for performing certain functionalities with respect to a security feature authentication input interface component 110s of FIG. 3 (e.g., a biometric input component or any other input component that may leverage secure authentication information of a user (e.g., PIN entry)), which may be used for authenticating use of a certain payment credential applet of secure element 145. As shown in FIG. 3, for example, such an authentication component 110s may be communicatively coupled with SEP 102b using any suitable bus link 118s, such as a serial peripheral interface ("SPI"), while communication component 106 may be communicatively coupled with processor 102 using any suitable bus link 118c, such as a serial peripheral interface ("SPI"), while device processor 102 may be communicatively coupled to NFC component 120 (e.g., NFC controller module 140) using any suitable bus link 118n, such as a high speed universal asynchronous receiver/transmitter ("UART") bus link, and/or while NFC controller module 140 may be communicatively coupled to secure element 145 using any suitable bus link 118e, such as a dual wire protocol bus link. As also shown in FIG. 3, AP 102a and SEP 102b may be configured to be communicatively coupled to one another using any suitable technique, such as a mailbox protocol technique, where each processor may store communications for retrieval by the other processor in one or more shared memory locations (e.g., secure shared memory location 104s) as a bus link 118m. When processor 102 of device 100 may include both AP 102a and SEP 102b, communication between NFC component 120 and processor 102 may be provided through AP 102a (e.g., via bus link 118n). Authentication component 110s and processor 102 (e.g., SEP 102b) may each include a set of shared secrets or shared keys that may be leveraged for enabling a securely encrypted channel for fostering secure communication therebetween (e.g., via bus link 118s). Similarly, as described below in more detail, secure element 145 and processor 102 (e.g., AP 102a or SEP 102b) may be provided with a set of shared secrets or shared keys (e.g., Auth Keys) that may be leveraged for enabling a securely encrypted channel for fostering secure communication therebetween (e.g., via bus links 118m, 118n, and 118e).

Description of FIG. 4

As shown in FIG. 4, and as described below in more detail, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Passbook App" textual indicator 181 (i.e., specific icon 184) is selected, device 100 may launch or otherwise access a specific application that may be associated with enabling user interaction with the various payment credential applets of secure element 145 and may display screens of a specific user interface that may include one or more tools or features for interacting with device 100 in a specific manner. For each application, screens may be displayed on display output component 112a and may include various user interface elements. Additionally or alternatively, for each application, various other types of non-visual information may be provided to a user via various other output components 112 of device 100.

Description of FIG. 5 and FIG. 6

To facilitate the following discussion regarding the operation of system 1 for securely pairing a secure element and a processor of an electronic device, reference is made to one or more processes of one or more flowcharts of FIGS. 5 and 6, and to various components of system 1 of the schematic diagrams of FIGS. 1-4.

FIG. 5 is a flowchart of an illustrative process 500 for securely pairing a secure element and a processor of an electronic device. Process 500 is shown being implemented by electronic device 100 (e.g., processor 102 and secure element 145), commercial entity subsystem 400, secure element vendor subsystem 450, and processor manufacturer subsystem 490. However, it is to be understood that process 500 may be implemented using any other suitable components or subsystems. Process 500 may enable establishment of a shared secret between processor 102 and secure element 145 such that processor 102 and secure element 145 may securely interact for enabling payment using a payment credential applet of secure element 145.

Process 500 may begin at step 502, where processor identification data may be stored in processor 102 by processor manufacturer subsystem 490 (e.g., via any suitable communications path 5 of system 1 using any suitable communications protocol). For example, processor 102 (e.g., AP 102a and/or SEP 102b) may be provided with any suitable processor identification data and/or any other suitable data such that processor 102 may then be packaged with other components (e.g., secure element 145) into device 100

(e.g., by commercial entity subsystem 400 or any other suitable device manufacturer). Such processor identification data may be generated by and/or injected by processor manufacturer subsystem 490 (e.g., in a secure facility of processor manufacturer subsystem 490). Processor identification data may include any suitable key or a set of any suitable keys at step 502, which may include one or more global identifiers ("GIDs") and/or one or more unique identifiers ("UIDs"). A GID may be a key that may be maintained by and/or known to not only processor 102 but also to any remote key custodian, such as processor manufacturer subsystem 490, and, thus, may not be considered a secret. A particular GID may be shared by all processors of a particular type or of any other suitable classification. For example, GID keys may be symmetric keys with particular values that may be shared by all processors of a specific platform. A UID may be a unique value that is specific to one particular processor 102. Such a UID may be generated by processor manufacturer subsystem 490 and injected by processor manufacturer subsystem 490 into processor 102, and then discarded by processor manufacturer subsystem 490 (e.g., at step 502), such that thereafter only processor 102 may know the unique value of any injected UID. Such a UID may only be known by processor 102 and may be used to perform cryptography operations, but may not be read out from processor 102 or its processor-specific memory, even by software running on that processor 102. Instead, as described below, such a UID may only be used to derive another key on-board that processor 102 (e.g., on the silicon of an SEP 102*b*). For example, a UID may be a 256 bit unique value that may be provided in a persistent state on a chip of processor 102, such as fused or non-erasable.

Next, at step 504, process 500 may include certain processor identification data being shared with commercial entity subsystem 400 by processor manufacturer subsystem 490 (e.g., via any suitable communications path 95 of system 1 using any suitable communications protocol). For example, at least some of the keys stored on processor 102 at step 502 may be shared with commercial entity subsystem 400 at step 504, including at least one GID. As just one example, a factory HSM of commercial entity subsystem 400 (e.g., HSM 402 of commercial entity subsystem 400 of FIG. 1A) may be configured to receive and store one or more GIDs for one or more classes of processors 102 that may be at least partially manufactured by processor manufacturer subsystem 490, such that commercial entity subsystem 400 may later leverage such a GID for enabling the validation of the authenticity of one or more communications between commercial entity subsystem 400 and processor 102 (e.g., as described below with respect to step 510 of process 500). In some embodiments, step 504 may be performed before or at least partially concurrently with step 502 rather than after step 502.

At step 506, process 500 may include commercial entity master key data ("CE master key data") being shared between commercial entity subsystem 400 and secure element vendor subsystem 450 (e.g., via any suitable communications path 75 of system 1 using any suitable communications protocol). For example, such CE master key data may be generated by commercial entity subsystem 400 and may be provided to secure element vendor subsystem 450 at step 506. Alternatively, such CE master key data may be generated by secure element vendor subsystem 450 and may be provided to commercial entity subsystem 400 at step 506. Such CE master key data may be used repeatedly by secure element vendor subsystem 450 and/or by commercial entity subsystem 400 as data provided by that subsystem. Such CE master key data may be retained by commercial entity subsystem 400 for later use (e.g., by a factory HSM of commercial entity subsystem 400 (e.g., HSM 402 of commercial entity subsystem 400 of FIG. 1A) at step 512 of process 500, as described below). Such CE master key data may be any suitable data of any suitable length and type.

At step 508, process 500 may include injecting initial secure element data into secure element 145 with secure element vendor subsystem 450 (e.g., via any suitable communications path 85 of system 1 using any suitable communications protocol). Such initial secure element data may include any suitable data for formatting secure element 145 such that secure element 145 may then be packaged with other components (e.g., processor 102) into device 100 (e.g., by commercial entity subsystem 400 or any other suitable device manufacturer). For example, such initial secure element data may include any suitable data for at least partially defining CASD 156 of secure element 145 (e.g., CASD-SK 158*a*, CASD-PK 158*b*, CASD-Cert. 158*c*, CASD-SCP key 158*d*, and/or CA-SP key 158*e*). As a specific example, CASD-SK 158*a* and CASD-PK 158*b* may be a unique asymmetric ECC-256 bit key pair, which, along with CASD-Cert. 158*c*, may be issued and injected by secure element vendor subsystem 450 (e.g., in a secure facility of secure element vendor subsystem 450, at step 508). In some embodiments, a unique key or other suitable identifier associated with secure element 145 (e.g., a unique secure element identifier ("SEID") that may be generated or otherwise accessible by secure element vendor subsystem 450) may be injected into or otherwise associated with secure element 145. For example, as shown in FIG. 3, such an SEID may be provided on CASD 158 (e.g., as SEID 158*f*), although, in other embodiments, such an SEID may be provided in any other suitable portion of secure element 145. Additionally or alternatively, such initial secure element data may include any suitable data for at least partially defining CESD 156 of secure element 145 (e.g., SCP transport key 156*a*). Before injection into secure element 145, SCP transport key 156*a* may first be derived using any suitable technique (e.g., by secure element vendor subsystem 450). For example, SCP transport key 156*a* may be derived using a unique key associated with secure element 145 (e.g., a unique secure element identifier ("SEID") that may be generated or otherwise accessible by secure element vendor subsystem 450) and the CE master key data described above with respect to step 506. Such an SEID, as well as such CE master key data, as well as SCP transport key 156*a* may be of any suitable length and type, where SCP transport key 156*a* may be derived from the SEID and the CE master key data in any suitable way (e.g., by secure element vendor subsystem 450 for use at step 508). Such an SCP transport key 156*a* may later be derived independently by commercial entity subsystem 400 for later use (e.g., by a factory HSM of commercial entity subsystem 400 (e.g., HSM 402 of commercial entity subsystem 400 of FIG. 1A) at step 512 of process 500, as described below). In some embodiments, step 508 may be performed before or at least partially concurrently with step 506 rather than after step 506.

At least after steps 502 and 508, but before step 510, described below, processor 102 of step 502 and secure element 145 of step 508 may be combined into a specific end-user system or device (e.g., electronic device 100) by any suitable entity (e.g., a device manufacturing entity of commercial entity subsystem 400). Due to such a combination, additional steps may be provided by process 500 for securely pairing that secure element 145 with that processor 102 through the establishment of a shared secret between processor 102 and secure element 145 such that processor 102 and secure element 145 may securely interact for enabling payment using a payment credential applet of secure element 145 (e.g., by an end user of device 100).

At step 510, process 500 may include accessing one or more Auth Keys from processor 102 of device 100 with commercial entity subsystem 400 (e.g., via any suitable communications path 65 of system 1 using any suitable communications protocol). Such Auth Keys may be generated or otherwise accessed by processor 102 in any suitable way, such as through use of any suitable key derivation function ("KDF") on an identifier of processor 102 and on an identifier of secure element 145. For example, such Auth Keys may be generated by processor 102 on device 100 using any suitable identifier of processor 102 (e.g., a UID or GID of step 502) and on any suitable identifier of secure element 145 (e.g., SEID 158f or SCP transport key 156a of step 508). In some embodiments, the processor identifier that may be utilized for deriving Auth Keys may be a processor identifier that was also shared with commercial entity subsystem 400 by processor manufacturer subsystem 490 at step 504 (e.g., a GID). Additionally or alternatively, the processor identifier that may be utilized for deriving Auth Keys may be a processor identifier that was not shared with commercial entity subsystem 400 by processor manufacturer subsystem 490 at step 504 (e.g., a UID). Similarly, in some embodiments, the secure element identifier that may be utilized for deriving Auth Keys may be a secure element identifier that was also shared with commercial entity subsystem 400 by secure element vendor subsystem 450 at step 506 (e.g., CE master key data). Additionally or alternatively, the secure element identifier that may be utilized for deriving Auth Keys may be a secure element identifier that was not shared with commercial entity subsystem 400 by secure element vendor subsystem 450 at step 506 (e.g., an SEID). Commercial entity subsystem 400 (e.g., HSM 402 of commercial entity subsystem 400 of FIG. 1A) may request generation and/or access to such one or more Auth Keys at step 510 using any suitable approach, such as by sending a request to processor 102 that may be authenticated by device 100 as having been generated by a trusted remote source (e.g., by running at least a portion of the request through code accessible to processor 102 that may have been provisioned on processor 102 by commercial entity subsystem 400). Device 100 may derive and return such Auth Keys to commercial entity subsystem 400 in any suitable manner that may also include any other suitable data with which commercial entity subsystem 400 may authenticate or validate that such Auth Keys came from a suitable source (e.g., through using a GID that may be associated with processor 102 of device 100 and that may have been shared with or made accessible to commercial entity subsystem 400 at an earlier time (e.g., at step 504)).

Then, at step 512, process 500 may include creating an initial secure channel between commercial entity subsystem 400 and secure element 145 (e.g., CESD 156) of device 100 (e.g., via any suitable communications path 65 of system 1 using any suitable communications protocol). For example, commercial entity subsystem 400 (e.g., HSM 402 of commercial entity subsystem 400 of FIG. 1A) may derive a copy of SCP transport key 156a of secure element 145 (e.g., using the CE master key data made available to commercial entity subsystem 400 at step 506 along with a copy of SEID 158f, which may have been shared with commercial entity subsystem 400 by device 100 as a portion of data provided to commercial entity subsystem 400 along with the Auth Keys at step 510), and commercial entity subsystem 400 may leverage that key as shared by secure element 145 and commercial entity subsystem 400 (e.g., SCP transport key) to generate an initial secure channel (e.g., by encrypting data to be communicated with that shared SCP transport key). Additionally, in some embodiments, once such an initial secure channel may exist, commercial entity subsystem 400 (e.g., HSM 402 of commercial entity subsystem 400 of FIG. 1A) may inject an additional key into secure element 145 (e.g., HSM SCP key 156b of CESD 156) at step 512 through any suitable confidential key agreement technique, such as ECKA, as may be defined in "GlobalPlatform Card, Security Upgrade for Card Content Management, Card Specification, Version 2.2, Amendment E, Version 1.0, November 2011," which is hereby incorporated by reference herein in its entirety. Once such an additional key is shared by secure element 145 and commercial entity subsystem 400, commercial entity subsystem 400 and secure element 145 may generate a robust secure channel with that key at step 512. Therefore, at step 512, one or more shared secrets or shared keys may be established amongst commercial entity subsystem 400 and secure element 145 (e.g., SCP transport key and/or HSM SCP key), which may be leveraged to enable a securely encrypted channel for fostering secure communication between commercial entity subsystem 400 and secure element 145 (e.g., by encrypting data to be communicated with a shared key).

Next, at step 514, using any suitable secure channel enabled at step 512, process 500 may include commercial entity subsystem 400 injecting the Auth Keys accessed from processor 102 at step 510 into secure element 145 (e.g., CESD 156) of device 100 (e.g., via any suitable communications path 65 of system 1 using any suitable communications protocol). For example, at step 514, commercial entity subsystem 400 (e.g., HSM 402 of commercial entity subsystem 400 of FIG. 1A) may inject the Auth Keys previously accessed by commercial entity subsystem 400 from processor 102 at step 510 (e.g., as may have been derived by processor 102 using a UID of processor 102 and an SEID 158f of secure element 145) into CRS applet 157 of CESD 156 of secure element 145 (e.g., as Auth Keys 157a) using a secure channel that may have been enabled at step 512 by system 1 (e.g., through leveraging SCP transport key 156a and/or HSM SCP key 156b for encrypting or otherwise securely communicating such Auth Keys from commercial entity subsystem 400 to secure element 145). In some embodiments, using HSM SCP key 156b rather than SCP transport key 156a may be preferred for securely communicating Auth Keys from commercial entity subsystem 400 to secure element 145, as, unlike SCP transport key 156a, HSM SCP key 156b may not be derivable by or known to secure element vendor subsystem 450, thereby reducing the risk of a security breach (e.g., if secure element vendor subsystem 450 is compromised).

Once Auth Keys 157a have been securely injected into secure element 145 by commercial entity subsystem 400 at step 512, such Auth Keys may be leveraged by secure element 145 and processor 102 (e.g., due to the ability of processor 102 to generate an independent version of such Auth Keys, as described with respect to step 510) as a shared secret or shared keys to enable a securely encrypted channel for fostering secure communication between processor 102 and secure element 145 (e.g., for encrypting or otherwise securely communicating information that may enable payment using a payment credential applet of secure element 145). Therefore, at step 516, for example, process 500 may include device processor 102 securely communicating, via such a secure channel leveraging the Auth Keys, any suitable commands to CESD 156 of secure element 145, which may enable any appropriate initialization or configuration of CRS applet 157 (e.g., for use in conducting a secure financial transaction within system 1 with a payment credential of secure element 145).

It is understood that the steps shown in process 500 of FIG. 5 are merely illustrative and that existing steps may be modified or omitted, additional steps may be added, and the order of certain steps may be altered. As just one example, steps 506 and 508 may be performed before, during, or after steps 502 and 504.

FIG. 6 is a flowchart of an illustrative process 600 for securely pairing a secure element and a processor of an electronic device. Process 600 is shown being implemented by electronic device 100 (e.g., AP 102a and SEP 102b of processor 102 and secure element 145), commercial entity subsystem 400, secure element vendor subsystem 450, and processor manufacturer subsystem 490. However, it is to be understood that process 600 may be implemented using any other suitable components or subsystems. Process 600 may enable establishment of a shared secret between processor 102 and secure element 145 such that processor 102 and secure element 145 may securely interact for enabling payment using a payment credential applet of secure element 145. Process 600 is described with respect to a device processor 102 that may be configured to include AP 102a and SEP 102b. However, it is to be understood that process 600 may also be implemented using a device processor 102 with only AP 102a and not SEP 102b, where all steps described below as being carried out by SEP 102b may be carried out by AP 102a and certain steps may be omitted (e.g., steps 614 and 618).

Process 600 may begin at step 602, which may be similar to step 502 of process 500, where processor identification data 652 may be stored at least partially in SEP 102b of processor 102 by processor manufacturer subsystem 490 (e.g., via any suitable communications path 5 of system 1 using any suitable communications protocol). For example, processor 102 (e.g., SEP 102b) may be provided with any suitable processor identification data 652 such that processor 102 may then be packaged with other components (e.g., secure element 145) into device 100 (e.g., by commercial entity subsystem 400 or any other suitable device manufacturer). Such processor identification data 652 may be generated by and/or injected by processor manufacturer subsystem 490 (e.g., in a secure facility of processor manufacturer subsystem 490). Processor identification data 652 may include any suitable key or a set of any suitable keys, which may include one or more global identifiers ("GIDs") and/or one or more unique identifiers ("UIDs"). A GID may be a key that may be maintained by and/or known to not only processor 102 but also to any remote key custodian, such as processor manufacturer subsystem 490, and, thus, may not be considered a secret. A particular GID may be shared by all processors of a particular type or of any other suitable classification. For example, GID keys may be symmetric keys with particular values that may be shared by all processors of a specific platform. A UID may be a unique value that is specific to one particular processor 102. Such a UID may be generated by processor manufacturer subsystem 490 and injected by processor manufacturer subsystem 490 into processor 102 as at least a portion of processor identification data 652, and then such a UID may be discarded by processor manufacturer subsystem 490 (e.g., also at step 602), such that thereafter only processor 102 may know the unique value of any injected UID of processor identification data 652. Such a UID may only be known by processor 102 and may be used to perform cryptography operations (e.g., for deriving Auth Keys, as described below with respect to step 616), but may not be read out from processor 102 or its processor-specific memory, even by software running on that processor 102. Instead, as described below (e.g., with respect to step 616), such a UID of processor identification data 652 may only be used to derive another key on-board that processor 102 (e.g., on the silicon of an SEP 102b). For example, a UID may be a 256 bit unique value that may be provided in a persistent state on a chip of processor 102, such as fused or non-erasable.

Next, at step 604, which may be similar to step 504 of process 500, process 600 may include certain processor identification data 654 being shared with commercial entity subsystem 400 by processor manufacturer subsystem 490 (e.g., via any suitable communications path 95 of system 1 using any suitable communications protocol). For example, at least some of the keys stored on processor 102 at step 602 as at least a portion of processor identification data 652 may be shared with commercial entity subsystem 400 at step 604 as processor identification data 654, including at least one GID. As just one example, a factory HSM of commercial entity subsystem 400 (e.g., HSM 402 of commercial entity subsystem 400 of FIG. 1A) may be configured to receive and store one or more GIDs as at least a portion of processor identification data 654 for one or more classes of processors 102 that may be at least partially manufactured by processor manufacturer subsystem 490, such that commercial entity subsystem 400 may later leverage such a GID of processor identification data 654 for enabling the validation of the authenticity of one or more communications between commercial entity subsystem 400 and processor 102 (e.g., as may be described below with respect to one or more of steps 625-628). In some embodiments, step 604 may be performed before or at least partially concurrently with step 602 rather than after step 602.

At step 606, which may be similar to step 506 of process 500, process 600 may include commercial entity master key data ("CE master key data") 656 being shared between commercial entity subsystem 400 and secure element vendor subsystem 450 (e.g., via any suitable communications path 75 of system 1 using any suitable communications protocol). For example, such CE master key data 656 may be generated by commercial entity subsystem 400 and may be provided to secure element vendor subsystem 450 at step 606. Alternatively, such CE master key data 656 may be generated by secure element vendor subsystem 450 and may be provided to commercial entity subsystem 400 at step 606. Such CE master key data 656 may be used repeatedly by secure element vendor subsystem 450 and/or by commercial entity subsystem 400 as data provided by that subsystem. Such CE master key data 656 may be retained by commercial entity subsystem 400 for later use (e.g., by a factory HSM of commercial entity subsystem 400 (e.g., HSM 402 of commercial entity subsystem 400 of FIG. 1A) at step 630 of process 600, as described below). Such CE master key data 656 may be any suitable data of any suitable length and type.

At step 608, which may be similar to step 508 of process 500, process 600 may include injecting initial secure element data 658 into secure element 145 with secure element vendor subsystem 450 (e.g., via any suitable communications path 85 of system 1 using any suitable communications protocol). Such initial secure element data 658 may include any suitable data for formatting secure element 145 such that secure element 145 may then be packaged with other components (e.g., processor 102) into device 100 (e.g., by commercial entity subsystem 400 or any other suitable device manufacturer). For example, such initial secure element data 658 may include any suitable data for at least partially defining CASD 156 of secure element 145 (e.g., CASD-SK 158a, CASD-PK 158b, CASD-Cert. 158c, CASD-SCP key 158d, and/or CA-SP key 158e). As a specific example, CASD-SK 158a and CASD-PK 158b may be a unique asymmetric ECC-256 bit key pair, which, along with CASD-Cert. 158c, may be issued and injected by secure element vendor subsystem 450 (e.g., in a secure facility of secure element vendor subsystem 450) as at least a portion of initial secure element data 658 at step 508. In some embodiments, a unique key or other suitable identifier associated with secure element 145 (e.g., a unique secure element identifier ("SEID") that may be generated or otherwise accessible by secure element vendor subsystem 450) may be injected into or otherwise associated with secure element 145 as at least a portion of initial secure element data 658 at step 608. For example, as shown in FIG. 3, such an SEID of initial secure element data 658 may be provided on CASD 156 (e.g., as SEID 158f), although, in other embodiments, such an SEID of initial secure element data 658 may be provided in any other suitable portion of secure element 145. Additionally or alternatively, such initial secure element data 658 may include any suitable data for at least partially defining CESD 156 of secure element 145 (e.g., SCP transport key 156a). Before injection into secure element 145 as at least a portion of initial secure element data 658, SCP transport key 156a may first be derived using any suitable technique (e.g., by secure element vendor subsystem 450 (e.g., prior to or at step 608)). For example, SCP transport key 156a of initial secure element data 658 may be derived using a unique key associated with secure element 145 (e.g., a unique secure element identifier ("SEID") that may be generated or otherwise accessible by secure element vendor subsystem 450) and CE master key data 656 described above with respect to step 606. Such an SEID 158f, as well as such CE master key data 656, as well as SCP transport key 156a may be of any suitable length and type, where SCP transport key 156a may be derived from SEID 158f and CE master key data 656 in any suitable way (e.g., by secure element vendor subsystem 450 for use at step 508) for use as at least a portion of initial secure element data 658. Such an SCP transport key 156a may later be derived independently by commercial entity subsystem 400 for later use (e.g., by a factory HSM of commercial entity subsystem 400 (e.g., HSM 402 of commercial entity subsystem 400 of FIG. 1A), such as at step 630 of process 600, as described below). In some embodiments, step 608 may be performed before or at least partially concurrently with step 606 rather than after step 606.

At least after steps 602 and 608, but before step 610, described below, processor 102 of step 602 and secure element 145 of step 608 may be combined into a specific end-user system or device (e.g., electronic device 100) by any suitable entity (e.g., a device manufacturing entity of commercial entity subsystem 400). Due to such a combination, additional steps may be provided by process 600 for securely pairing that secure element 145 with that processor 102 through the establishment of a shared secret between processor 102 and secure element 145 such that processor 102 and secure element 145 may securely interact for enabling payment using a payment credential applet of secure element 145 (e.g., by an end user of device 100).

One or more of the following steps 610-628 of process 600 may realize at least a portion or all of step 510 of process 500 for accessing one or more Auth Keys from processor 102 of device 100 with commercial entity subsystem 400 (e.g., via any suitable communications path 65 of system 1 using any suitable communications protocol). Such Auth Keys may be generated or otherwise accessed by processor 102 in any suitable way, such as through use of any suitable key derivation function ("KDF") on an identifier of processor 102 and on an identifier of secure element 145. For example, such Auth Keys may be generated by processor 102 (e.g., SEP 102b) on device 100 using any suitable identifier of processor 102 (e.g., at least a portion of processor identification data 652 of step 602, such as a UID or GID) and on any suitable identifier of secure element 145 (e.g., at least a portion of initial secure element data 658 of step 608, such as SEID 158f or SCP transport key 156a). In some embodiments, the processor identifier that may be utilized for deriving Auth Keys may be a processor identifier that may have also been shared with commercial entity subsystem 400 by processor manufacturer subsystem 490 as at least a portion of shared processor identification data 654 at step 604 (e.g., a GID). Additionally or alternatively, the processor identifier that may be utilized for deriving Auth Keys may be a processor identifier that may not have been shared with commercial entity subsystem 400 by processor manufacturer subsystem 490 as at least a portion of shared processor identification data 654 at step 604 (e.g., a UID). Similarly, in some embodiments, the secure element identifier that may be utilized for deriving Auth Keys may be a secure element identifier that may have also been shared with commercial entity subsystem 400 by secure element vendor subsystem 450 as at least a portion of CE master key data 656 at step 606. Additionally or alternatively, the secure element identifier that may be utilized for deriving Auth Keys may be a secure element identifier that may not have been shared with commercial entity subsystem 400 by secure element vendor subsystem 450 as at least a portion of CE master key data 656 at step 606 (e.g., an SEID).

At step 610 of process 600, commercial entity subsystem 400 (e.g., HSM 402 of commercial entity subsystem 400 of FIG. 1A) may generate and transmit Auth Key request data 660 to processor 102 (e.g., to AP 102a). Such Auth Key request data 660 may include any suitable data that may be received by processor 102 and utilized by device 100 to generate and share Auth Keys with commercial entity subsystem 400. For example, such Auth Key request data 660 may include an HSM Challenge and/or an HSM Certificate ("Cert."). For example, such Auth Key request data 660 may be received by processor 102 and utilized by processor 102 and/or secure element 145 of device 100 to authenticate that such Auth Key request data 660 was generated by and/or received from a trusted remote source (e.g., by running at least a portion of Auth Key request data 660 through code that may be accessible to processor 102 that may have been provisioned on processor 102 by commercial entity subsystem 400), as may be described below with respect to one or more of steps 615-617.

At step 611 of process 600 (e.g., in response to receiving such Auth Key request data 660), processor 102 (e.g., AP 102a) may generate and transmit secure element request data 661 to secure element 145. Such transmit secure element request data 661 may be any suitable data for requesting any appropriate data from secure element 145 for use by processor 102 in deriving the requested Auth Keys (e.g., at step 616 below) to be provided to commercial entity subsystem 400 and/or for enabling commercial entity subsystem 400 to later validate the authenticity of such Auth Keys (e.g., at step 625 below). Such data requested of secure element 145 by secure element request data 661 of step 611 may include SEID 158*f*, CASD-Cert. 158*c*, and/or any other suitable data, and such data (e.g., SEID 158*f* and CASD-Cert. 158*c*) may be provided from secure element 145 to processor 102 (e.g., AP 102*a*) as at least a portion of secure element response data 662 at step 612.

Next, at step 614 of process 600, AP 102*a* may transmit SEP request data 664 to SEP 102*b* for instructing SEP 102*b* to derive the requested Auth Keys for eventual sharing with commercial entity subsystem 400. For example, such SEP request data 664 may include at least a portion of Auth Key request data 660 (e.g., HSM Challenge and/or HSM Cert.) and/or at least a portion of secure element response data 662 (e.g., at least SEID 185*f* or also CASD-Cert. 158*c*). It is to be understood that if processor 102 were to only include AP 102*a* and not SEP 102*b*, step 614 may be omitted and AP 102*a* may alone leverage both received Auth Key request data 660 and received secure element response data 662 for deriving Auth Keys at processor 102*a* for eventual sharing with commercial entity subsystem 400.

Next, at step 615, process 600 may include processor 102 (e.g., SEP 102*b*) processing at least a portion of Auth Key request data 660 (e.g., an HSM Cert.) for validating such data and, thus, the source of such a request for Auth Keys (e.g., commercial entity subsystem 400). For example, an HSM Cert. may be a certified public key, which may be certified by a manufacturer of device 100, and where such a root public key (e.g., an HSM PK) may be included or accessible to code that may have been provided to processor 102 (e.g., SEP 102*b*) by that manufacturer or otherwise (e.g., prior to step 610), such that processor 102 (e.g., SEP 102*b*) may properly validate the HSM Cert. and, thus, validate the source of the request for the Auth Key (e.g., commercial entity subsystem 400). Then, if such validation is successful, processor 102 (e.g., SEP 102*b*) may derive or otherwise access the requested Auth Keys and then, in some embodiments, encrypt such Auth Keys, at step 616 of process 600. For example, such derivation of Auth Keys at step 616 may include processor 102 leveraging both an identifier of processor 102 as well as an identifier of secure element 145, as described above. As just one particular example, processor 102 (e.g., SEP 102*b*) may use any suitable KDF on a UID processor identifier (e.g., as may have been fused into or otherwise made available to processor 102 as at least a portion of processor identification data 652 at step 602) and on SEID 158*f* (e.g., as may have been provided to processor 102 by secure element 145 as at least a portion of secure element response data 662 at step 612, which may have been provided to secure element 145 itself as at least a portion of initial secure element data 658 at step 608). Additionally, in some embodiments, also at step 616, processor 102 (e.g., SEP 102*b*) may encrypt such Auth Keys using any suitable data, such as an HSM public key (e.g., an HSM PK), where such an HSM PK may have been received by processor 102 or otherwise accessed by processor 102 through receipt of Auth Key request data 660 (e.g., HSM Challenge and/or HSM Cert.) and/or by a root public key accessible by code available to processor 102, where such encryption may prevent the Auth Keys being shared from being used by any entity unable to decrypt such an encryption (e.g., any entity other than commercial entity subsystem 400, which may also have access to that public key HSM PK (e.g., as accessible to commercial entity subsystem 400 prior to or at step 610)). Next, at step 617, process 600 may include processor 102 (e.g., SEP 102*b*) computing an HMAC_SEP (e.g., a message authentication code) in any suitable way, such as by using a processor identifier (e.g., a GID, which may have been provided to processor 102 as at least a portion of processor identification data 652 at step 602) on the encrypted Auth Key data of step 616 and on any suitable data from Auth Key request data 660 (e.g., HSM Challenge) and on an ECID. ECID may be a unique identifier of processor 102 (e.g., of AP 102*a* and/or SEP 102*b*), which may have been provided to processor 102 by processor manufacturer subsystem 490 as a portion of data 652 at step 602 or otherwise, and which may have been provided to commercial entity subsystem 400 by processor manufacturer subsystem 490 as a portion of data 654 at step 604 or otherwise. Therefore, such an ECID may be read-out (e.g., shareable) for use by other entities (e.g., commercial entity subsystem 400, such as at one or more of steps 625-627, described below), unlike UID or other secret processor identifiers. Such an HMAC_SEP may be considered a "signature" of processor 102 (e.g., SEP 102*b*), which may later be verified by commercial entity subsystem 400 as authentic or generated by a processor with which commercial entity subsystem 400 has a relationship with (e.g., a processor of which commercial entity subsystem 400 may know its GID and/or ECID or the HSM Challenge used, as may be described below with respect to one or more of steps 625-627). Next, at step 618, process 600 may include SEP 102*b* sharing such encrypted Auth Keys of step 616 and such computed HMAC_SEP of step 617 with AP 102*a* as SEP response data 668. As mentioned above, it is to be understood that if processor 102 were to only include AP 102*a* and not SEP 102*b*, steps 615-617 may be achieved by AP 102*a* and step 618 may be omitted.

At step 620 of process 600, processor 102 (e.g., AP 102*a*) may generate and transmit secure element authorization request data 670 to secure element 145. Such secure element authorization request data 670 may include any suitable data that may be received by secure element 145 for generating a secure element signature on at least a portion of such data. For example, such secure element authorization request data 670 may include an "Internal Auth" command with the encrypted Auth Keys of step 616 and/or HMAC_SEP computed at step 617 and/or ECID of step 617. Then, at step 622 of process 600, secure element 154 may generate and transmit secure element authorization response data 672 to processor 102 (e.g., AP 102*a*), which may include any suitable data, such as an SE Signature, which may sign one or more portions of authorization request data 670 (e.g., one or more or all of the encrypted Auth Keys of step 616 and/or HMAC_SEP computed at step 617 and/or ECID of step 617) with any suitable key, such as private key CASD-SK 158*a* of CASD 158 of secure element 145. Next, at step 624 of process 600, processor 102 (e.g., AP 102*a*) may receive such secure element authorization response data 672 of step 622 and then generate and transmit any suitable Auth Key response data 674 to commercial entity subsystem 400 (e.g., HSM 402). Such Auth Key response data 674 may include the encrypted Auth Keys of step 616 and/or the HMAC_SEP computed at step 617 and/or ECID of step 617, one or more of which may be signed by the SE signature of secure element authorization response data 672 of step 622 (e.g., CASD-SK 158*a*), and/or CASD-Cert. 158*c* of secure element response data 662 of step 612 and/or SEID 158*f* of secure element response data 662 of step 612.

Commercial entity subsystem 400 (e.g., HSM 402) may be configured to process such Auth Key response data 674 received at step 624 in one or more suitable ways for authenticating the source of such data for securely enabling the use of at least a portion of such data (e.g., the Auth Keys of step 616) for injection into secure element 145, which may thereby enable secure communication between processor 102 (e.g., SEP 102b) and secure element 145 (e.g., CRS applet 157). For example, at step 625 of process 600, commercial entity subsystem 400 (e.g., HSM 402) may validate CASD-Cert. 158c, which may be received by commercial entity subsystem 400 as at least a portion of Auth Key response data 674 at step 624 (e.g., a portion of Auth Key response data 674 provided to processor 102 by secure element 145 as at least a portion of secure element response data 662 of step 612). In some embodiments, a root public key that may be used for validating CASD-Cert. 158c may be accessible to commercial entity subsystem 400 (e.g., such a root public key (e.g., CASD-PK 158b or otherwise) may have been provided to commercial entity subsystem 400 as at least a portion of data 656 at step 606 by secure element vendor subsystem 450). Alternatively or additionally, at step 626 of process 600, commercial entity subsystem 400 (e.g., HSM 402) may validate an SE Signature, which may be received by commercial entity subsystem 400 as at least a portion of Auth Key response data 674 at step 624 (e.g., a portion of Auth Key response data 674 provided to processor 102 by secure element 145 as at least a portion of secure element authorization response data 672 of step 622), which may be accomplished using the validated CASD-Cert. of step 625 or otherwise for authenticating the secure element of the source that provided Auth Key response data 674 (e.g., secure element 145). Alternatively or additionally, at step 627 of process 600, commercial entity subsystem 400 (e.g., HSM 402) may validate an HMAC_SEP, which may be received by commercial entity subsystem 400 as at least a portion of Auth Key response data 674 at step 624 (e.g., a portion of Auth Key response data 674 computed by processor 102 at step 617), which may be accomplished by leveraging processor identification data known to commercial entity subsystem 400 (e.g., a GID and/or ECID and/or any other suitable portion of shared processor identification data 654 of step 604) so as to at least partially authenticate the source of Auth Key response data 674 (e.g., processor 102). Additionally or additionally, at step 628 of process 600, commercial entity subsystem 400 (e.g., HSM 402) may decrypt encrypted Auth Keys, which may be received by commercial entity subsystem 400 as at least a portion of Auth Key response data 674 at step 624 (e.g., a portion of Auth Key response data 674 derived and encrypted by processor 102 at step 616). Such decryption may be accomplished using a private key known to commercial entity subsystem 400 (e.g., an HSM SK, which may be a key of a pair also including HSM PK as described above with respect to step 616). In some embodiments, such decryption of encrypted Auth Keys of Auth Key response data 674 may only be enabled or enacted by commercial entity subsystem 400 if one or more or all of the validations of one or more or all of steps 625-627 is successful. Therefore, in some embodiments, device 100 may derive and return Auth Keys to commercial entity subsystem 400 in any suitable manner as at least a portion of Auth Key response data 674, which may also include any other suitable data with which commercial entity subsystem 400 may authenticate or validate that such Auth Keys came from a suitable source (e.g., through using a GID that may be associated with processor 102 of device 100 and that may have been shared with or made accessible to commercial entity subsystem 400 at an earlier time (e.g., at step 504)).

After commercial entity subsystem 400 (e.g., HSM 402) has suitably authenticated at least a portion of Auth Key response data 674 from processor 102 of device 100, process 600 may include creating at least an initial secure channel between commercial entity subsystem 400 and secure element 145 (e.g., CESD 156) of device 100 (e.g., via any suitable communications path 65 of system 1 using any suitable communications protocol). For example, commercial entity subsystem 400 may derive a copy of SCP transport key 156a of secure element 145 (e.g., using at least a portion CE master data 656 made available to commercial entity subsystem 400 at step 606 along with a copy of SEID 158f, which may have been shared with commercial entity subsystem 400 by device 100 as a portion of Auth Key response data 674 at step 624 (e.g., a portion of Auth Key response data 674 provided to processor 102 by secure element 145 as at least a portion of secure element response data 662 of step 612)), and commercial entity subsystem 400 may leverage that derived SCP transport key as a key or secret shared by secure element 145 and commercial entity subsystem 400 to generate such an initial secure channel (e.g., through leveraging the SCP transport key for encrypting or otherwise securely communicating information between commercial entity subsystem 400 and secure element 145). For example, at step 630 of process 600, commercial entity subsystem 400 (e.g., HSM 402) may be configured to at least initiate the establishment of at least an initial secure channel with secure element 145 by generating and transmitting secure channel setup request data 680 to secure element 145 (e.g., via any suitable communications path 65 of system 1 using any suitable communications protocol), which may include or otherwise leverage an SCP transport key (e.g., SCP transport key 156a, as may be independently derived by commercial entity subsystem 400 (e.g., prior to or at the beginning of step 630)). In response to receiving such secure channel setup data 680 at step 632 of process 600, secure element 145 may be configured to generate and transmit secure channel setup response data 682 to commercial entity subsystem 400 (e.g., via any suitable communications path 65 of system 1 using any suitable communications protocol), where such secure channel setup response data 682 may include any suitable data such as a Card Crypto and/or a Card Challenge, as may be defined in "GlobalPlatform Card Technology, Secure Channel Protocol 03, Card Specification, Version 2.2, Amendment D, Version 1.1, September 2009," which is hereby incorporated by reference herein in its entirety. In some embodiments, data 680 of step 630 may include an "initialize update" command and/or an "external authenticate" command, or any other suitable command or commands as may be defined by GlobalPlatform or other standard, that may be used by secure element 145 based on SCP transport key 156a.

Additionally, in some embodiments, once such an initial secure channel may exist, commercial entity subsystem 400 (e.g., HSM 402) may inject an additional key into secure element 145 (e.g., HSM SCP key 156b of CESD 156) through any suitable confidential key agreement technique, such as ECKA, as may be defined in "GlobalPlatform Card, Security Upgrade for Card Content Management, Card Specification, Version 2.2, Amendment E, Version 1.0, November 2011," which is hereby incorporated by reference herein in its entirety. Once such an additional key is shared by secure element 145 and commercial entity subsystem 400, commercial entity subsystem 400 and secure element 145 may generate a robust secure channel with that key. For example, at steps 633-640, process 600 may include commercial entity subsystem 400 and secure element 145 generating a robust secure channel for enabling secure injection of Auth Keys into secure element 145 from commercial entity subsystem 400 (e.g., as Auth Keys 157a described below at step 642). At step 633, process 600 may include commercial entity subsystem 400 (e.g., HSM 402) generating an ephemeral key pair, such as an ephemeral public key ePK and an ephemeral private key eSK. Next, at step 634, process 600 may include commercial entity subsystem 400 sharing such a commercial entity ephemeral public key ePK with secure element 145 as ephemeral public key data 684 (e.g., via the initial secure channel setup at steps 630 and 632). Alternatively, in some embodiments, such an ePK may be encrypted by the SCP transport key for generating a secure channel for such an ePK as a single communication to secure element 145. Then, at step 635, in response to receiving such ephemeral public key data 684, secure element 145 may be configured to calculate a first shared secret using the ePK of that ephemeral public key data 684 as well as a suitable private key available to secure element (e.g., a private key SK.CASD.ECKA, which may be the same as or similar to CASD-SK 158*a* of CASD 158, and/or which may have an associated public key PK.CASD.ECKA, which may be the same as or similar to CASD-PK 158*b* of CASD 158). Moreover, at step 635, secure element 145 may be configured to generate one or more keys HSM SCP Keys 156*b*, which may be stored in CESD 156, using any suitable KDF and the first shared secret. Next, secure element public key data 686 (e.g., PK.CASD.ECKA, which may be the same as or similar to CASD-PK 158*b* of CASD 158) may be shared with commercial entity subsystem 400 by secure element 145 at step 636 of process 600 (e.g., via the initial secure channel setup at steps 630 and 632 and used at step 634). Then, at step 637, in response to receiving such secure element public key data 686, commercial entity subsystem 400 (e.g., HSM 402) may be configured to calculate a second shared secret using that secure element public key data 686 as well as a suitable ephemeral private key available to commercial entity subsystem 400 (e.g., the commercial entity ephemeral public key ePK generated at step 633). Moreover, at step 637, commercial entity subsystem 400 may be configured to generate one or more keys (e.g., HSM SCP Keys, which may be similar to or the same as HSM SCP Keys 156*b* of step 635) using any suitable KDF and the second shared secret. Therefore, through respective generation of HSM SCP Keys at both secure element 145 and at commercial entity subsystem 400 (e.g., at steps 633-637), process 600 may enable commercial entity subsystem 400 to generate and transmit a robust secure channel setup request data 688 at step 638 (e.g., via any suitable communications path 65 of system 1 using any suitable communications protocol), which may include or otherwise leverage HSM SCP Keys (e.g., HSM SCP Keys 156*b*, as may be independently derived by commercial entity subsystem 400 (e.g., at step 637) and by secure element 145 (e.g., at step 635)) to establish such a secure channel. In response to receiving such robust secure channel setup data 688 at step 638 of process 600, secure element 145 may be configured to generate and transmit robust secure channel setup response data 690 to commercial entity subsystem 400 at step 640 (e.g., via any suitable communications path 65 of system 1 using any suitable communications protocol), where such secure channel setup response data 690 may include any suitable data such as an "Auth Complete" response. In some embodiments, data 688 of step 638 may include an "initialize update" command and/or an "external authenticate" command, or any other suitable command or commands as may be defined by GlobalPlatform or other standard, that may be used by secure element 145 based on HSM SCP Keys 156*b*.

Next, at step 642, using any suitable secure channel enabled between commercial entity subsystem 400 (e.g., HSM 402) and secure element 145 (e.g., as enabled by steps 630 and 632 with shared secret keys SCP transport key 156*a* and/or by steps 633-640 with shared secret keys HSM SCP key 156*b*), process 600 may include commercial entity subsystem 400 injecting the Auth Keys accessed from processor 102 via Auth Key response data 674 of step 624 (e.g., the Auth Keys decrypted at step 628) into secure element 145 (e.g., CESD 156) of device 100 (e.g., via any suitable communications path 65 of system 1 using any suitable communications protocol). For example, at step 642, commercial entity subsystem 400 (e.g., HSM 402) may transmit Auth Key Data 692 to secure element 145 for injecting the Auth Keys previously accessed by commercial entity subsystem 400 from processor 102 at steps 610-628 (e.g., as may have been derived by processor 102 using a UID of SEP 102*b* and an SEID 158*f* of secure element 145) into CRS applet 157 of CESD 156 of secure element 145 (e.g., as Auth Keys 157*a*) using a secure channel that may have been enabled at one or more of steps 630-640 (e.g., through leveraging SCP transport key 156*a* and/or HSM SCP key 156*b* for encrypting or otherwise reformatting such Auth Keys through an encrypted channel for securely communicating such Auth Keys between commercial entity subsystem 400 and secure element 145). Alternatively, in some embodiments, such Auth Keys may be encrypted by the SCP transport key and/or the HSM SCP key for generating a secure channel for such Auth Keys as a single communication to secure element 145. In response to receiving such Auth Keys 157*a* as Auth Key Data 692 at step 642 of process 600, secure element 145 may be configured to generate and transmit key setup complete data 694 to commercial entity subsystem 400 at step 644 (e.g., via any suitable communications path 65 of system 1 using any suitable communications protocol), where such key setup complete data 694 may include any suitable data such as a "Key Setup Complete" response. In some embodiments, using HSM SCP key rather than SCP transport key may be preferred for securely communicating Auth Keys from commercial entity subsystem 400 to secure element 145, as, unlike SCP transport key 156*a*, HSM SCP key 156*b* may not be derivable by or known to secure element vendor subsystem 450, thereby reducing the risk of a security breach (e.g., if secure element vendor subsystem 450 is compromised).

Once Auth Keys 157*a* have been securely injected into secure element 145 by commercial entity subsystem 400 at step 642, such Auth Keys may be leveraged by secure element 145 and processor 102 (e.g., due to the ability of processor 102 to generate an independent version of such Auth Keys, as described with respect to step 616) as a shared secret or shared keys to enable a securely encrypted channel for fostering secure communication between processor 102 and secure element 145 (e.g., for encrypting or otherwise securely communicating information that may enable payment using a payment credential applet of secure element 145). Therefore, at step 646, for example, process 600 may include device processor 102 (e.g., SEP 102*b*) securely communicating, via such a secure channel leveraging the Auth Keys, any suitable commands to CESD 156 of secure element 145, which may enable any appropriate initialization or other suitable configuration of CRS applet 157 (e.g., for use in conducting a secure financial transaction within system 1 with a payment credential of secure element 145). As just one example, secure command data 696 may include a command (e.g., an "Authorization Random" command) that may be suitable for marking-for-delete all payment credential applets of secure element 145 (e.g., payment credential applet 153 of SPSD 154). This may be useful such that whenever new Auth Keys are programmed in secure element 145 (e.g., at step 642), such secure command data 696 may then be communicated to secure element 145 for disabling all future use of previously provisioned payment credentials, which may provide an additional layer of security in case the newly programmed Auth Keys have been provided to secure element 145 maliciously or otherwise not according to the secure procedure of process 600. In response to receiving such secure command data 696 at step 646 of process 600, secure element 145 may be configured to generate and transmit status response data 698 to processor 102 (e.g., to SEP 102b or AP 102a) at step 648, where such status response data 698 may include any suitable data (e.g., data for confirming an update in the status of secure element 145).

It is understood that the steps shown in process 600 of FIG. 6 are merely illustrative and that existing steps may be modified or omitted, additional steps may be added, and the order of certain steps may be altered. As just one example, steps 606 and 608 may be performed before, during, or after steps 602 and 604.

Description of FIG. 7

FIG. 7 is a flowchart of an illustrative process 700 for securely pairing a secure element and a processor of an electronic device. At step 702, process 700 may include accessing, at a commercial entity subsystem, a key from a processor of an electronic device. For example, as described above, commercial entity subsystem 400 may access an Auth Key from processor 102 of electronic device 100. Next, at step 704, process 700 may include injecting, at the commercial entity subsystem, the accessed key into a secure element of the electronic device. For example, as described above, commercial entity subsystem 400 may inject an accessed Auth Key into secure element 145 of electronic device 100.

It is understood that the steps shown in process 700 of FIG. 7 are merely illustrative and that existing steps may be modified or omitted, additional steps may be added, and the order of certain steps may be altered.

Description of FIG. 8

FIG. 8 is a flowchart of an illustrative process 800 for securely pairing a secure element and a processor of an electronic device. At step 802, process 800 may include deriving, at an electronic device, a key using a processor of the electronic device. For example, as described above, electronic device 100 may derive an Auth Key using processor 102. Next, at step 804, process 800 may include sharing, at the electronic device, the derived key with a commercial entity subsystem. For example, as described above, electronic device 100 may share a derived Auth Key with commercial entity subsystem 400. Next, at step 806, process 800 may include receiving, at a secure element of the electronic device, the shared key from the commercial entity subsystem. For example, as described above, secure element 145 of electronic device 100 may receive a shared Auth Key from commercial entity subsystem 400.

It is understood that the steps shown in process 800 of FIG. 8 are merely illustrative and that existing steps may be modified or omitted, additional steps may be added, and the order of certain steps may be altered.

Further Description of FIG. 1, FIG. 1A, FIG. 2, FIG. 3, and FIG. 4

Although not shown, commercial entity subsystem 400 of FIG. 1A may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component (e.g., factory HSM 402 of FIG. 1A), and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out operations on device 100 in concert with financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1A and/or electronic device 100 via communications path 65 of FIG. 1A).

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications 5 between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1A), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., a merchant terminal of merchant subsystem 200).

NFC component 120 may include any suitable modules for enabling contactless proximity-based communication 15 between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 5. Additionally or alternatively, NFC data module 132 may be configured to contain, route, or otherwise receive any suitable data that may be received by NFC component 120 from merchant subsystem 200 as part of a contactless proximity-based communication 15.

NFC transceiver or NFC antenna 134 may be any suitable antenna or other suitable transceiver circuitry that may generally enable communication of communication 5 from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication 5 between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 5 to subsystem 200. For example, shared antenna 116 may require amplification from booster 136 before antenna 116 (e.g., a non-loop antenna) may be properly enabled for communicating contactless proximity-based or NFC communication 5 between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 15 between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 15) from NFC tags (e.g., from merchant subsystem 200) to NFC data module 132, a peer-to-peer mode for exchanging data (e.g., communication 5) with another NFC enabled device (e.g., merchant subsystem 200), and a card emulation mode for allowing another NFC enabled device (e.g., merchant subsystem 200) to read information (e.g., communication 15) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication 5 between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 106 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") (e.g., SPSD 154) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa) may be the TSM for SPSD 154 and applet 153 of SPSD 154 may be associated with a commerce credential managed by that first payment network subsystem 360, while a second payment network subsystem 360 (e.g., MasterCard) may be the TSM for another SPSD (not shown).

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

A merchant terminal of merchant subsystem 200 of FIGS. 1 and 1A may include a reader for detecting, reading, or otherwise receiving NFC communication 15 from electronic device 100 (e.g., when electronic device 100 comes within a certain distance or proximity D of the terminal). Accordingly, it is noted that NFC communication 15 between such a merchant terminal and electronic device 100 may occur wirelessly and, as such, may not require a clear "line of sight" between the respective devices. As mentioned, NFC device module 130 may be passive or active. When passive, NFC device module 130 may only be activated when within a response range D of a suitable reader of terminal. For instance, a reader of a terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to the terminal as NFC communication 15. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to the terminal as NFC communication 15, rather than reflect radio frequency signals, as in the case of a passive NFC device module 130. Such a merchant terminal may be provided by a merchant of merchant subsystem 200 (e.g., in a store of the merchant for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication 15 between electronic device 100 and a terminal. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication 15 between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 4, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Setup Assistant App" textual indicator 181 (i.e., specific icon 183) is selected, device 100 may launch or otherwise access a specific application and may display screens of a specific user interface that may include one or more tools or features for interacting with device 100 in a specific manner. For each application, screens may be displayed on display output component 112a and may include various user interface elements. Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user (e.g., of authentication component 110s of FIG. 3)). As shown in FIG. 4, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 4). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-8 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 1100 may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112*a*). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112*a*) with graphical data to display a graphical user interface ("GUI") 180. GUI 180 may be configured to receive touch input via a touch input component 110*f*. Embodied as a touch screen (e.g., with display output component 112*a* as I/O component 114*a*), touch I/O component 110*f* may display GUI 180. Alternatively, GUI 180 may be displayed on a display (e.g., display output component 112*a*) separate from touch input component 110*f*. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110*f*, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for securely pairing a secure element and a processor of an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
    accessing, by a commercial entity subsystem, an authorization key from a processor of an electronic device, the commercial entity subsystem being separate and remote from the electronic device;
    deriving, by the commercial entity subsystem, a transport key of a security domain of a secure element of the electronic device;
    leveraging the derived transport key for securely generating a shared commercial key on the security domain of the secure element; and
    after the leveraging, injecting, by the commercial entity subsystem and using the shared commercial key, the accessed authorization key onto the security domain of the secure element of the electronic device, wherein the electronic device is configured to use the injected authorization key for enabling a secure communication channel between the processor and the secure element of the electronic device.

2. The method of claim 1, further comprising, after the accessing but before the injecting, at the commercial entity subsystem, leveraging a global identifier ("GID") of the processor to authenticate the accessing.

3. The method of claim 2, further comprising, prior to the accessing, receiving the GID at the commercial entity subsystem from a manufacturer of the processor.

4. The method of claim 1, wherein:
    the deriving comprises deriving the transport key at the commercial entity subsystem using a master key; and
    prior to the deriving, the method comprises sharing the master key of the commercial entity subsystem with a vendor of the secure element.

5. The method of claim 4, further comprising, prior to the accessing, at the vendor of the secure element:
    deriving the transport key at the vendor using the shared master key and a unique identifier of the secure element; and
    disposing the derived transport key and the unique identifier on the security domain of the secure element.

6. The method of claim 5, wherein:
    the accessing comprises accessing the authorization key and the unique identifier from the electronic device; and
    the deriving the transport key at the commercial entity subsystem comprises deriving the transport key at the commercial entity subsystem using the master key and the accessed unique identifier.

7. The method of claim 1, wherein leveraging the derived transport key for securely generating the shared commercial key on the security domain of the secure element comprises: generating an initial secure channel between the commercial entity subsystem and the secure element using the transport key, and using the initial secure channel to inject the shared commercial key onto the security domain of the secure element.

8. The method of claim 1, wherein the injecting comprises the commercial entity subsystem leveraging the shared commercial key for injecting the authorization key into the secure element through a secure channel between the commercial entity subsystem and the secure element.

9. A method comprising:
    deriving an authorization key using a processor of an electronic device;
    after the deriving, sharing the derived authorization key, by the electronic device, with a commercial entity subsystem that is remote from the electronic device;
    leveraging a transport key of a security domain of a secure element of the electronic device for secure generation of a shared commercial key on the security domain of the secure element of the electronic device,
    after the leveraging, receiving, using the shared commercial key, the shared authorization key from the commercial entity subsystem on the security domain of the secure element of the electronic device; and
    after the receiving, using, at the electronic device, the received authorization key for enabling a secure communication channel between the processor and the secure element.

10. The method of claim 9, wherein the deriving comprises using a processor identifier stored on the processor and a secure element identifier stored on the secure element.

11. The method of claim 10, wherein the sharing comprises sharing the derived authorization key and the secure element identifier with the commercial entity subsystem.

12. The method of claim 9, wherein the receiving comprises receiving the shared authorization key from the commercial entity subsystem with the secure element using a secure channel between the commercial entity subsystem and the secure element enabled by the shared commercial key.

13. The method of claim 12, wherein:
    the deriving comprises using a processor identifier stored on the processor and a secure element identifier stored on the secure element;
    the sharing comprises sharing the derived authorization key and the secure element identifier with the commercial entity subsystem; and
    the transport key is derivable from the shared secure element identifier.

14. The method of claim 12, further comprising, prior to the deriving, receiving the transport key at the secure element.

15. The method of claim 9, further comprising, at the electronic device, leveraging the secure communication channel to alter a contactless registry service of the secure element.

16. An electronic device comprising:
    a processor component; and
    a secure element comprising a security domain, wherein:
        the processor component is operative to derive an authorization key;

the processor component is further operative to share the derived authorization key with a commercial entity subsystem remote from the electronic device;

the secure element is operative to leverage a transport key of the security domain for secure generation of a shared commercial key on the security domain;

the secure element is operative to receive, on the security domain and using the shared commercial key, the shared authorization key from the commercial entity subsystem; and the secure element is further operative to use the received authorization key for enabling a secure communication channel between the processor component and the secure element.

17. The electronic device of claim 16, wherein the processor component is further operative to use the secure communication channel for altering a contactless registry service of the secure element.

18. The electronic device of claim 16, wherein:

the processor component comprises an application processor and a secure processor;

the application processor is operative to receive a request for the authorization key from the commercial entity subsystem; and the application processor is further operative to instruct the secure processor to derive the authorization key in response to the received request.

19. The electronic device of claim 18, wherein the secure processor is operative to derive the authorization key using a unique processor identifier stored in the secure processor.

20. The electronic device of claim 18, wherein the secure processor is operative to derive the authorization key using a unique processor identifier stored in the secure processor and a unique secure element identifier.

21. The electronic device of claim 18, wherein the secure element is further operative to use the transport key to generate an initial secure channel with the commercial entity subsystem and to receive the shared commercial key from the commercial entity subsystem via the initial secure channel.

22. A non transitory computer readable medium comprising computer readable instructions recorded thereon for:

accessing an authorization key, by a commercial entity subsystem, from a processor of an electronic device that is remote from the commercial entity subsystem;

deriving, by the commercial entity subsystem, a transport key of a security domain of the secure element;

leveraging the derived transport key for securely generating a shared commercial key on the security domain of the secure element; and injecting, by the commercial entity subsystem and using the shared commercial key, the accessed authorization key from the commercial entity subsystem onto the security domain of the secure element of the electronic device; and establishing a shared secret between the processor of the electronic device and the secure element of the electronic device with the injected authorization key.

23. The non transitory computer readable medium of claim 22, further comprising additional computer readable instructions recorded thereon for, after the accessing but before the injecting, at the commercial entity subsystem, leveraging a global identifier ("GID") of the processor to authenticate the accessing.

24. A system comprising:

a processor manufacturer subsystem;

a secure element vendor subsystem; and a commercial entity subsystem, wherein:

the processor manufacturer subsystem stores processor identifier data on a processor;

the processor manufacturer subsystem shares at least a portion of the processor identifier data with the commercial entity subsystem;

the secure element vendor subsystem shares a master transport key with the commercial entity subsystem;

the secure element vendor subsystem derives a secure transport key using the master transport key and secure element identifier data;

the secure element vendor subsystem stores the secure transport key and the secure element identifier data on a security domain of a secure element;

the commercial entity subsystem produces an electronic device comprising the processor and the secure element;

the commercial entity subsystem accesses an authorization key from the processor of the electronic device;

the commercial entity subsystem derives the master transport key of the security domain of the secure element;

the commercial entity subsystem leverages the derived transport key for securely generating a shared commercial key on the security domain of the secure element;

the commercial entity subsystem injects, using the shared commercial key, the accessed authorization key onto the security domain of the secure element of the electronic device; and the electronic device uses the injected authorization key for enabling a secure communication channel between the processor and the secure element.

25. The electronic device of claim 16, wherein the secure element is separate from, and external to, the processor component.

26. The electronic device of claim 16, wherein the authorization key comprises a symmetric key.

27. The system of claim 24, wherein the processor manufacturer subsystem, the secure element vendor subsystem, and the commercial entity subsystem are each separate subsystems.

28. The system of claim 24, wherein the processor of the electronic device is configured to derive the authorization key based at least in part on the processor identifier data stored on the processor by the processor manufacturer subsystem.

* * * * *